US008738437B2

(12) United States Patent
Gailey et al.

(10) Patent No.: US 8,738,437 B2
(45) Date of Patent: May 27, 2014

(54) PASSIVE MINING OF USAGE INFORMATION IN A LOCATION-BASED SERVICES SYSTEM

(75) Inventors: Michael L. Gailey, Dunwoody, GA (US); Eric A. Portman, Norcross, GA (US); Michael J. Burgiss, Smyrna, GA (US); Chad S. Holmes, Atlanta, GA (US); Angela King Smith, Atlanta, GA (US)

(73) Assignee: Accenture Global Services Limited, Dublin (IE)

( * ) Notice: Subject to any disclaimer, the term of this patent is extended or adjusted under 35 U.S.C. 154(b) by 740 days.

(21) Appl. No.: 11/007,761

(22) Filed: Dec. 8, 2004

(65) Prior Publication Data

US 2005/0102180 A1    May 12, 2005

Related U.S. Application Data

(63) Continuation of application No. 10/133,537, filed on Apr. 26, 2002, now Pat. No. 6,848,542, which is a continuation-in-part of application No. 09/946,111, filed on Sep. 4, 2001.

(60) Provisional application No. 60/286,916, filed on Apr. 27, 2001.

(51) Int. Cl.
*G06Q 30/02* (2012.01)

(52) U.S. Cl.
USPC .................. 705/14.41; 705/14.53; 705/14.58; 705/14.64; 705/14.66

(58) Field of Classification Search
CPC .......... G06Q 30/0242; G06Q 30/0255; G06Q 30/0261; G06Q 30/0267; G06Q 30/0269
USPC ............... 705/14, 14.41, 14.53, 14.58, 14.64, 705/14.66
See application file for complete search history.

(56) References Cited

U.S. PATENT DOCUMENTS

| 4,586,160 | A | 4/1986 | Amano et al. ................. 364/900 |
| 4,791,281 | A | 12/1988 | Johnsen et al. ............... 235/383 |
| 5,343,493 | A | 8/1994 | Karimullah ....................... 375/1 |
| 5,479,488 | A | 12/1995 | Lennig et al. .................. 379/67 |
| 5,491,629 | A | 2/1996 | Fox et al. ...................... 364/420 |

(Continued)

FOREIGN PATENT DOCUMENTS

| EP | 0 837 406 A2 | 4/1998 | ............. G06F 17/30 |
| JP | 11-046193 | 2/1999 | ............. H04L 12/18 |

(Continued)

OTHER PUBLICATIONS

Google definitions of "server" downloaded May 31, 2009.*

(Continued)

*Primary Examiner* — Donald L. Champagne
(74) *Attorney, Agent, or Firm* — Brinks Gilson & Lione

(57) ABSTRACT

A method and system for providing advertising effectiveness searching capabilities, predictive modeling capabilities and usage mining in a location-based services system is disclosed. During operation of the location-based services system, usage information for advertising campaigns placed on the location-based services system is stored. Advertisers are provided with the ability to enter a search request form on a remote terminal to mine the usage information. The search request is then transmitted to an application that searches usage information to generate a response to said search request.

30 Claims, 5 Drawing Sheets

(56) References Cited

U.S. PATENT DOCUMENTS

| | | | |
|---|---|---|---|
| 5,559,707 A | 9/1996 | DeLorme et al. | 364/443 |
| 5,625,668 A | 4/1997 | Loomis et al. | 379/58 |
| 5,638,425 A | 6/1997 | Meador, III et al. | 379/88 |
| 5,652,570 A | 7/1997 | Lepkofker | 340/573 |
| 5,663,734 A | 9/1997 | Krasner | 342/357 |
| 5,682,525 A | 10/1997 | Bouve et al. | 395/615 |
| 5,717,923 A | 2/1998 | Dedrick | |
| 5,752,232 A | 5/1998 | Basore et al. | 704/275 |
| 5,757,232 A | 5/1998 | Hosoya | 330/252 |
| 5,764,731 A | 6/1998 | Yablon | 379/88 |
| 5,774,860 A | 6/1998 | Bayya et al. | 704/275 |
| 5,794,204 A | 8/1998 | Miyazawa et al. | 704/275 |
| 5,794,235 A | 8/1998 | Chess | 707/5 |
| 5,804,803 A | 9/1998 | Cragun et al. | 235/375 |
| 5,809,471 A | 9/1998 | Brodsky | 704/275 |
| 5,860,063 A | 1/1999 | Gorin et al. | 704/257 |
| 5,898,680 A | 4/1999 | Johnstone et al. | 370/316 |
| 5,905,246 A * | 5/1999 | Fajkowski | 235/375 |
| 5,924,070 A | 7/1999 | Ittycheriah et al. | 704/275 |
| 5,963,940 A | 10/1999 | Liddy et al. | 707/5 |
| 6,014,090 A | 1/2000 | Rosen et al. | 340/905 |
| 6,016,426 A * | 1/2000 | Bodell | 455/422.1 |
| 6,049,711 A | 4/2000 | Ben-Yehezkel et al. | 455/414 |
| 6,052,439 A | 4/2000 | Gerzberg et al. | 379/88.01 |
| 6,073,112 A | 6/2000 | Geerlings | 705/14 |
| 6,076,099 A | 6/2000 | Chen et al. | 709/202 |
| 6,091,956 A | 7/2000 | Hollenberg | 455/456 |
| 6,112,174 A | 8/2000 | Wakisaka et al. | 704/251 |
| 6,125,342 A | 9/2000 | Selesky | 704/9 |
| 6,134,532 A | 10/2000 | Lazarus et al. | 705/14 |
| 6,157,705 A | 12/2000 | Perrone | 379/88.01 |
| 6,167,255 A | 12/2000 | Kennedy, III et al. | 455/414 |
| 6,181,927 B1 * | 1/2001 | Welling et al. | 455/414.1 |
| 6,185,535 B1 | 2/2001 | Hedin et al. | 704/270 |
| 6,195,641 B1 | 2/2001 | Loring et al. | 704/275 |
| 6,199,099 B1 | 3/2001 | Gershman et al. | 709/203 |
| 6,202,023 B1 | 3/2001 | Hancock et al. | 701/201 |
| 6,219,696 B1 | 4/2001 | Wyblatt et al. | 709/218 |
| 6,233,559 B1 | 5/2001 | Balakrishnan | 704/275 |
| 6,236,977 B1 | 5/2001 | Verba et al. | 705/10 |
| 6,243,684 B1 | 6/2001 | Stuart et al. | 704/275 |
| 6,246,672 B1 | 6/2001 | Lumelsky | 370/310 |
| 6,250,557 B1 | 6/2001 | Forslund et al. | 235/492 |
| 6,301,480 B1 | 10/2001 | Kennedy, III et al. | 455/445 |
| 6,301,560 B1 | 10/2001 | Masters | 704/275 |
| 6,308,151 B1 | 10/2001 | Smith | 704/235 |
| 6,317,718 B1 | 11/2001 | Fano | 705/1 |
| 6,332,127 B1 | 12/2001 | Bandera et al. | 705/14 |
| 6,336,098 B1 | 1/2002 | Fortenberry et al. | 705/14 |
| 6,353,398 B1 | 3/2002 | Amin et al. | 340/995 |
| 6,360,167 B1 | 3/2002 | Millington et al. | 701/211 |
| 6,370,514 B1 | 4/2002 | Messner | |
| 6,400,956 B1 | 6/2002 | Richton | 455/456 |
| 6,408,307 B1 | 6/2002 | Semple et al. | 707/104.1 |
| 6,418,199 B1 | 7/2002 | Perrone | 379/88.01 |
| 6,418,216 B1 | 7/2002 | Harrison et al. | 379/208.01 |
| 6,424,945 B1 | 7/2002 | Sorsa | 704/270.1 |
| 6,427,115 B1 | 7/2002 | Sekiyama | 701/208 |
| 6,434,524 B1 | 8/2002 | Weber | 704/257 |
| 6,434,526 B1 | 8/2002 | Cilurzo et al. | 704/270.1 |
| 6,452,498 B2 | 9/2002 | Stewart | 340/573.1 |
| 6,460,036 B1 | 10/2002 | Herz | 707/10 |
| 6,466,796 B1 | 10/2002 | Jacobson et al. | 455/456 |
| 6,466,899 B1 | 10/2002 | Yano et al. | 704/1 |
| 6,493,671 B1 | 12/2002 | Ladd et al. | 704/270 |
| 6,501,833 B2 | 12/2002 | Phillips et al. | 379/88.07 |
| 6,502,076 B1 | 12/2002 | Smith | 705/14 |
| 6,505,046 B1 | 1/2003 | Baker | 455/456 |
| 6,510,417 B1 | 1/2003 | Woods et al. | 704/275 |
| 6,513,052 B1 | 1/2003 | Binder | 707/204 |
| 6,535,743 B1 | 3/2003 | Kennedy, III et al. | 455/456 |
| 6,535,854 B2 | 3/2003 | Buchner et al. | 704/275 |
| 6,560,456 B1 | 5/2003 | Lohtia et al. | 455/445 |
| 6,606,745 B2 | 8/2003 | Maggio | 725/23 |
| 6,609,005 B1 | 8/2003 | Chern | 455/457 |
| 6,614,885 B2 | 9/2003 | Polcyn | 379/88.02 |
| 6,647,257 B2 | 11/2003 | Owensby | 455/414.1 |
| 6,677,894 B2 | 1/2004 | Sheynblat et al. | 342/357.1 |
| 6,731,940 B1 | 5/2004 | Nagendran | 455/456.1 |
| 6,748,418 B1 | 6/2004 | Yoshida | 709/204 |
| 6,757,544 B2 | 6/2004 | Rangarajan et al. | 455/456.1 |
| 6,760,426 B2 | 7/2004 | Sbisa et al. | 379/221.09 |
| 6,792,096 B2 | 9/2004 | Martin et al. | 379/218.01 |
| 6,813,499 B2 | 11/2004 | McDonnell et al. | 455/456.1 |
| 6,834,195 B2 * | 12/2004 | Brandenberg et al. | 455/456.3 |
| 6,847,825 B1 | 1/2005 | Duvall et al. | 455/456.3 |
| 6,848,542 B2 | 2/2005 | Gailey et al. | 186/35 |
| 6,850,766 B2 | 2/2005 | Lau et al. | 455/456.1 |
| 6,859,777 B2 | 2/2005 | Krasle | 704/270.1 |
| 6,898,571 B1 * | 5/2005 | Val et al. | 705/14 |
| 6,901,366 B1 | 5/2005 | Kuhn et al. | 704/275 |
| 6,907,119 B2 | 6/2005 | Case et al. | 379/218.01 |
| 6,937,986 B2 | 8/2005 | Denenberg et al. | 704/275 |
| 6,937,995 B1 | 8/2005 | Kepecs | 705/14 |
| 6,944,447 B2 | 9/2005 | Portman et al. | 455/422.1 |
| 6,961,706 B2 | 11/2005 | Saito | 704/275 |
| 6,968,513 B1 | 11/2005 | Rinebold et al. | 715/854 |
| 6,970,830 B1 | 11/2005 | Samra et al. | 705/10 |
| 6,993,326 B2 | 1/2006 | Link, II et al. | 455/414.1 |
| 6,996,531 B2 | 2/2006 | Korall et al. | 704/270 |
| 7,006,983 B1 | 2/2006 | Packes, Jr. et al. | 705/14 |
| 7,013,148 B1 | 3/2006 | Ganesh | 455/456.1 |
| 7,020,609 B2 | 3/2006 | Thrift et al. | 704/270.1 |
| 7,028,072 B1 | 4/2006 | Kliger et al. | 709/203 |
| 7,050,816 B2 | 5/2006 | Fukui et al. | 455/456.1 |
| 7,050,977 B1 | 5/2006 | Bennett | 704/270.1 |
| 7,069,238 B2 * | 6/2006 | l'Anson et al. | 705/26 |
| 7,089,264 B1 * | 8/2006 | Guido et al. | 707/104.1 |
| 7,130,630 B1 | 10/2006 | Enzmann et al. | 455/435.1 |
| 7,233,655 B2 | 6/2007 | Gailey et al. | 379/210.01 |
| 7,245,910 B2 | 7/2007 | Osmo | 455/432.1 |
| 7,254,384 B2 | 8/2007 | Gailey et al. | 455/412 |
| 7,336,942 B2 | 2/2008 | Wang | 455/404.2 |
| 7,343,317 B2 | 3/2008 | Jokinen et al. | 705/14 |
| 7,376,586 B1 | 5/2008 | Partovi et al. | 705/26 |
| 7,412,260 B2 | 8/2008 | Gailey et al. | 455/563 |
| 7,437,295 B2 | 10/2008 | Pitts, III et al. | 704/275 |
| 7,526,278 B2 | 4/2009 | Link, II et al. | 455/414.1 |
| 7,698,228 B2 | 4/2010 | Gailey et al. | 705/64 |
| 7,860,519 B2 | 12/2010 | Portman et al. | 455/456.3 |
| 7,970,648 B2 | 6/2011 | Gailey et al. | 705/14.49 |
| 2001/0044309 A1 | 11/2001 | Bar et al. | 455/456 |
| 2001/0053999 A1 | 12/2001 | Feinberg | 705/14 |
| 2002/0004745 A1 | 1/2002 | Bascobert et al. | 705/14 |
| 2002/0029172 A1 | 3/2002 | l'Anson et al. | 705/26 |
| 2002/0035474 A1 | 3/2002 | Alpdemir | 704/270 |
| 2002/0035568 A1 | 3/2002 | Benthin et al. | 707/102 |
| 2002/0036654 A1 | 3/2002 | Evans et al. | 345/744 |
| 2002/0040297 A1 | 4/2002 | Tsiao et al. | 704/257 |
| 2002/0046084 A1 | 4/2002 | Steele et al. | 705/14 |
| 2002/0046104 A1 | 4/2002 | Kaddeche et al. | 705/14 |
| 2002/0049644 A1 * | 4/2002 | Kargman | 705/26 |
| 2002/0090934 A1 | 7/2002 | Mitchelmore | 455/412 |
| 2002/0103698 A1 | 8/2002 | Cantrell | 705/14 |
| 2002/0107027 A1 | 8/2002 | O'Neil | 455/456 |
| 2002/0133477 A1 | 9/2002 | Abel | 707/1 |
| 2002/0143550 A1 | 10/2002 | Nakatsuyama | 704/270.1 |
| 2002/0143638 A1 | 10/2002 | August et al. | 705/26 |
| 2002/0143639 A1 | 10/2002 | Beckett et al. | 705/26 |
| 2002/0161625 A1 | 10/2002 | Brito-Valladares et al. | 705/10 |
| 2002/0161647 A1 | 10/2002 | Gailey et al. | 705/14 |
| 2002/0164971 A1 | 11/2002 | Link, II et al. | 455/414 |
| 2002/0166127 A1 | 11/2002 | Hamano et al. | 725/105 |
| 2003/0023440 A1 * | 1/2003 | Chu | 704/249 |
| 2003/0032409 A1 | 2/2003 | Hutcheson et al. | 455/414 |
| 2003/0041050 A1 | 2/2003 | Smith et al. | 707/1 |
| 2003/0065620 A1 | 4/2003 | Gailey et al. | 705/51 |
| 2003/0065749 A1 | 4/2003 | Gailey et al. | 709/219 |
| 2003/0135853 A1 | 7/2003 | Goldman et al. | 725/34 |
| 2003/0154126 A1 | 8/2003 | Gehlot et al. | 705/14 |
| 2003/0182131 A1 | 9/2003 | Arnold et al. | 704/275 |
| 2004/0166832 A1 | 8/2004 | Portman et al. | 455/412.1 |
| 2004/0243417 A9 | 12/2004 | Pitts, III et al. | 704/276 |
| 2005/0027590 A9 | 2/2005 | Gailey et al. | 705/14 |

(56) References Cited

U.S. PATENT DOCUMENTS

| | | | | |
|---|---|---|---|---|
| 2005/0027591 | A9 | 2/2005 | Gailey et al. | 705/14 |
| 2005/0102180 | A1* | 5/2005 | Gailey et al. | 705/14 |
| 2005/0221812 | A9 | 10/2005 | Gailey et al. | 455/422.1 |
| 2008/0270224 | A1 | 10/2008 | Portman et al. | 705/10 |

FOREIGN PATENT DOCUMENTS

| | | | |
|---|---|---|---|
| JP | 11-065434 | 3/1999 | G09B 29/10 |
| JP | 11-069404 | 3/1999 | H04Q 7/20 |
| JP | 2000-067047 | 3/2000 | G06F 17/27 |
| JP | 2000-268042 | 9/2000 | G06F 17/30 |
| JP | 2001-004387 | 1/2001 | G01C 21/00 |
| JP | 2001-005483 | 1/2001 | G10L 15/00 |
| JP | 2001-014252 | 1/2001 | G06F 13/00 |
| JP | 2001-043479 | 2/2001 | G08G 1/0005 |
| JP | 2001-057593 | 2/2001 | H04M 3/487 |
| JP | 2001-101000 | 4/2001 | G06F 9/44 |
| JP | 2001-516905 | 10/2001 | G10L 15/18 |
| JP | 2002-536755 | 10/2002 | G06F 17/28 |
| KR | 1999-0082755 | 11/1999 | H04B 1/06 |
| WO | WO 97/50002 | 12/1997 | G01S 3/02 |
| WO | WO 98/49641 | 11/1998 | G06F 17/60 |
| WO | WO 98/58334 | 12/1998 | |
| WO | WO 99/14743 | 3/1999 | G10L 5/06 |
| WO | WO 99/62013 | 12/1999 | G06F 17/60 |
| WO | WO 00/21232 | 4/2000 | |
| WO | WO 00/29982 | 5/2000 | G06F 17/30 |
| WO | WO 00/35216 | 6/2000 | H04Q 7/22 |
| WO | WO 00/46792 | 8/2000 | G10L 15/18 |
| WO | WO 01/26393 A1 | 4/2001 | H04Q 7/20 |

OTHER PUBLICATIONS

Google definitions of "gateway", downloaded Dec. 6, 2009.*
Google definitions of "advertising campaign", downloaded Dec. 7, 2009.*
Two documents: Google definitions of "business rule", downloaded Dec. 12, 2009 and Google definitions of "probability", downloaded Dec. 12, 2009.*
Google search for definitions of "data scoring", downloaded Dec. 13, 2009.*
Akiyama, T., Niwa, M., Watanabe, M., Tonikashi, M., Konishi, T., Itoh, Y., "Constructing a Natural Language Interface of Car Navigation Systems," Collection of Reports Produced to the Information Processing Academy, vol. 99, No. ITS-2, pp. 53-60, published by the Information Processing Academy on Jun. 3, 1999; (Translation—Abstract only).
"The Risks Digest," ACM Committee on Computers and Public Policy, Peter G. Neumann, moderator, vol. 21, Issue 5, Sep. 2000, http://catless.ncl.ac.uk/Risks/21.05.html.
Japanese Office Action dated Sep. 13, 2010, in Japanese Application No. 2007-107349, with English translation (6 pgs.).
Taniguchi, Y., Mizuno, H., Yajima, H., "Constrained Learning Algorithm of Neural Networks for an Estimate of Advertising Effect," The Transactions of the Institute of Electrical Engineers of Japan, Apr. 20, 1997, vol. 117-C, No. 5, pp. 625-630; 10 pages total, including English translation.
"CellPoint continues to strengthen its position in the location services and telematics markets," M@ Presswire, Oct. 11, 2000 © 1994-2000 MS Communications Ltd., pp. 1-4.
Hamblen, M., "Ensuring Portable Privacy," Computerworld, Dec. 11, 2000, ISSN: 0010-4841 © Computerworld, Inc., 2000; © Gale Group 2001; pp. 1-5.
James, D., "It'll be a wireless, wireless, wireless, wireless, wireless world," Marketing News, Jul. 17, 2000; ISSN: 0025-3790; © American Marketing Association; pp. 1-4.
McGinity, M., "Surfing your turf," Association for Computing Machinery, Communications of the ACM, Apr. 2000, ISSN: 0001-0782; © Association for Computing Machinery, Apr. 2000; pp. 1-4.
Nobel, C., Callaghan, D., "Wireless service hits snags—Location-based advertisers for wireless devices must rethink strategies to spur customer adoption," eWeek, Dec. 18, 2000; © 2000 ZDNet; © 2001 Gale Group; pp. 1-3.
Zue, V., Seneff, S., Glass, J.R., Polifroni, J., Pao, C., Hazen, T.J., Hetherington, L., "Jupiter: A Telephone-Based Conversational Interface for Weather Information," IEEE Transactions on Speech and Audio Processing, IEEE Service Center, New York, NY US, vol. 8, No. 1, Jan. 1, 2000, XP011053991, ISSN: 1063-6676, pp. 85-96.
European Search Report dated Sep. 5, 2011, issued in European Patent Application No. 11164128.8, European Patent Office, 7 pgs.
Nakajima, T., "Review of Web Sites, Goal Being Sites Easy to Use for User," Nikkei Internet Technology, Nikkei Business Publications, Inc., Japan, Oct. 22, 2000, vol. 40, pp. 122-139. (with concise explanation of relevance in English).
Shirai, H., Yokoyama, K., Sudo, M., Hakomori, S., Inoue, U., "Design and Implementation of a User Oriented Information System in a Mobile Computing Environment," Research Paper in Information Processing Society, IPSJ, Japan, May 15, 1998, vol. 98, No. 34, pp. 9-16. (with concise explanation of relevance in English).
Japanese Office Action in Japanese Application No. 2007-107349, dated Jan. 4, 2010, with English translation (7 pgs.).

* cited by examiner

PASSIVE MINING OF USAGE INFORMATION IN A LOCATION-BASED SERVICES SYSTEM

This application is a continuation of U.S. patent application Ser. No. 10/133,537, filed Apr. 26, 2002, now U.S. Pat. No. 6,848,542 which, is a continuation-in-part of U.S. patent application Ser. No. 09/946,111, filed Sep. 4, 2001, which claims the benefit of U.S. Provisional Application Ser. No. 60/286,916, filed Apr. 27, 2001. In addition, the following commonly owned patents and patent application, some of which are incorporated by reference in the present application, are related to this application: U.S. patent application Ser. No. 10/131,898, filed Apr. 25, 2002, entitled NATURAL LANGUAGE PROCESSING FOR A LOCATION-BASED SERVICES SYSTEM: U.S. patent application Ser. No. 10/133,536, filed. Apr. 26, 2002, entitled ADVERTISING CAMPAIGN BUSINESS LISTING MANAGEMENT FOR A LOCATION-BASED SERVICES SYSTEM; U.S. Pat. No. 6,848,542 B2, issued Feb. 1, 2005; U.S. patent application Ser. No. 10/133,118, filed Apr. 26, 2002, entitled ROUTING CALL FAILURES IN A LOCATION-BASED SERVICES SYSTEM; U.S. patent application Ser. No. 10/134,405, entitled TRACKING PURCHASES IN A LOCATION-BASED SERVICES SYSTEM; and U.S. Pat. No. 6,944,447 B2, issued Sep. 13, 2005, entitled LOCATION-BASED SERVICES.

FIELD OF THE INVENTION

The present invention relates generally to providing information to communication devices and, more particularly, to a system and method for passive mining of usage information in a location-based services system.

BACKGROUND OF THE INVENTION

Wireless communication devices have recently evolved from a technology used by an elite segment of the population to a technology that is used by the masses. In the year 2000, it has been estimated that well over 100 million people in the United States alone subscribed to at least one type of wireless communication service. Worldwide, the number of wireless communication device users has reached a staggering number and is growing all of the time. In the near future, it is envisioned that almost everyone will own or use some sort of wireless communication device that is capable of performing a variety of functions.

In addition to traditional wireless communication devices, many different types of portable electronic devices are in use today. In particular, notebook computers, palm-top computers, and personal digital assistants (PDA) are commonplace. The use of wireless communication devices is widespread and it is expected that in the near future combined mobile telephone/PDA devices will be widely used by the masses. Currently, most of these devices are only used by a small segment of the population due, in large part, to the fact that there are a limited number of applications and services available for such devices.

The Internet has become a widely used medium for providing business information in a variety of forms that are targeted to various types of individuals and businesses. Generally speaking, one of the problems associated with searching for business information on specific products and services using the Internet are being able to locate relevant business information for products and services that are available in a geographic area that is located near the user. As such, a need exists for a way to provide a broad range of business information and content to wireless communication devices and workstations that are based on the respective geographic location of the communication device at the time the information is requested.

Users of several different types of remote terminals often desire to use directory assistance services that are provided by various telephone companies. Many of these directory assistance calls originate in a respective metropolitan telephone service area and request listing information for listings contained in the same metropolitan service area. Most local directory assistance services in use today are handled by an operator that assists the requestor by manually inputting the requested information into an application that searches a database containing residential and business listings. As such, a need exists for providing an enhanced directory assistance system that is capable of automatically providing geographically targeted responses to requesters.

Another need exists for methods and systems that allow business users of these types of systems to search through historical usage records. These records can be used by business users for various types of research and record keeping.

SUMMARY OF THE PRESENT INVENTION

A preferred embodiment of the present invention discloses a method for providing advertising effectiveness searching capabilities in a location-based services system. In the preferred embodiment, usage information for advertising campaigns placed on the location-based services system is stored in a usage data database. A search request form containing at least one input field is generated on a remote terminal. A search request is then entered into the search request form with the remote terminal. The search request is then transmitted to an advertising effectiveness application that is preferentially located on an advertiser portal that is connected to the location-based services system. The usage information is then searched to generate a response to the search request and the response is then transmitted to the remote terminal.

In the preferred embodiment, the usage information may be selected from a group of information including a time of access, a location of access, an identity of individuals who received a respective advertising campaign, a total number of people who received a respective advertising campaign, a total number of people who responded to a respective advertising campaign, a time and date a respective advertising campaign was run, a product listing for a respective advertising campaign and a service listing for a respective advertising campaign.

The search request form is preferentially generated on a web browser located on the remote terminal. A usage analysis user interface application generates the search request form and then transmits it to the remote terminal via the advertiser portal. The search results that are obtained from the usage data database may be formatted into viewable segments with a data scoring application. The usage analysis user interface application is preferentially used to transmit the response to the remote terminal. The remote terminal can be a wireless communication device in some preferred embodiments.

Another preferred embodiment of the present invention discloses a method for providing predictive modeling in a location-based services system. Predictive modeling allows users to forecast or predict the types of users and numbers of users that are likely to respond to or receive advertising campaigns based on historical records that are contained in a usage data database. In this embodiment, an advertising campaign is created with a remote terminal. The advertising campaign is then transmitted to a predictive modeling application that is preferentially located on an advertiser portal. A profile data file and a usage data database are then searched to generate a predictive model for the advertising campaign and the predictive model is then transmitted to the remote terminal.

In this preferred embodiment, the advertising campaign that has been created includes at least one business rule. The business rule is extracted with a business rule application that is located on the advertiser portal and is used to assist in searching the profile data files and the usage data database. A usage analysis user interface application is used to generate the sample advertising campaign. In the preferred embodiment, the predictive model is formatted in a viewable format using a data scoring application. The predictive model is preferentially transmitted to the remote terminal using a usage analysis user interface application. The remote terminal may be a wireless communication device in other embodiments of the present invention.

Another preferred embodiment of the present invention discloses a method for searching usage information in a location-based services system. In this embodiment, usage information for the location-based services system is stored in a usage data database. An advertiser portal is provided to a remote terminal. A search request form is generated on the remote terminal that allows the user to generate a search. The user can then input a search request into the search request form using the remote terminal that is transmitted to the advertiser portal. The usage data database is then searched to generate a response to the search request that is transmitted to the remote terminal.

In this preferred embodiment, the search request form is generated with a usage analysis user interface application located on the advertiser portal. The search results are preferentially formatted into a viewable format with a data scoring application. The response is transmitted to the remote terminal with a usage analysis user interface application on the advertiser portal. The remote terminal may be a wireless communication device.

Further objects and advantages of the present invention will be apparent from the following description, reference being made to the accompanying drawings wherein preferred embodiments of the invention are clearly illustrated.

DETAILED DESCRIPTION OF THE PRESENTLY PREFERRED EMBODIMENTS OF THE INVENTION

Figure 1:
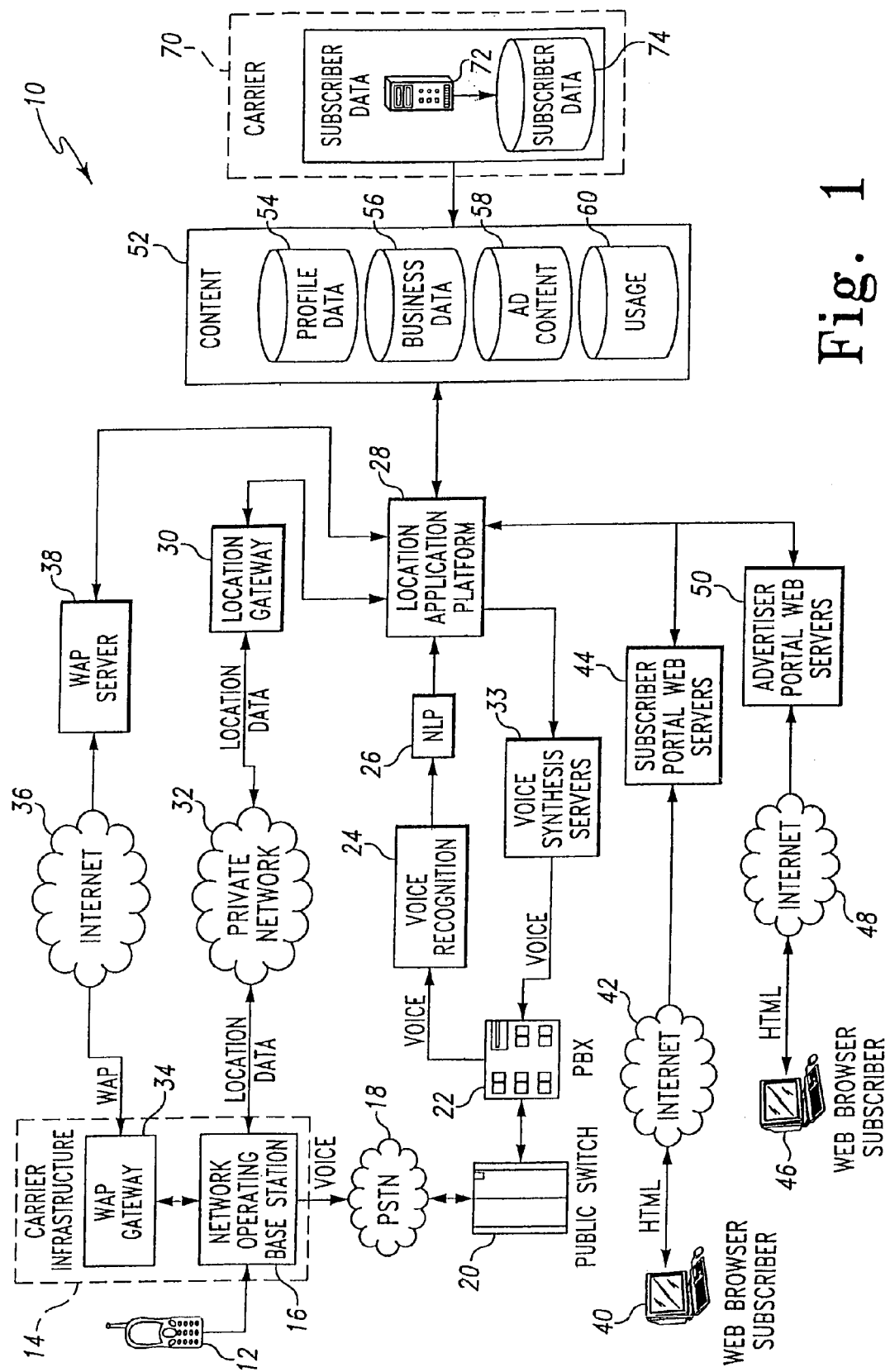
FIG. 1 illustrates a preferred embodiment of the location-based services system.

The present invention discloses a method and system for delivering location-based services through a variety of communication networks. Referring to FIG. 1, the preferred location-based services system 10 uses the geographic location of a remote terminal 12 to provide geographically targeted services to the remote terminal 12. Remote terminals 12 that subscribe to the location-based services system 10 are capable of selecting and receiving information from a broad range of business and service providers that are located in a geographic region that is close to the remote terminal 12 and, thus, the user.

As illustrated in FIG. 1, one preferred embodiment of the location-based services system 10 includes a remote terminal 12 that is connected to a wireless communication system 14 using one of several available and commonly used communication protocols. As illustrated, the remote terminal 12 is connected to a base station 16 of the wireless communication system 14, which transmits and receives radio signals to the remote terminal 12 during operation. Those skilled in the art would recognize that although only one base station 16 is illustrated in FIG. 1, several base stations 16 are actually used to make-up the preferred wireless communication system 14. Ideally, the preferred wireless communication system 14 would cover a wide geographic region, such as, by way of example only, the entire United States.

In the preferred embodiment of the present invention, the remote terminal 12 is capable of sending a digital input signal to the base station 16. The term digital input signal should be broadly construed to include voice signals, keypad input data, and pointer device selections or data from any other commonly used means for inputting data into a respective remote terminal 12. Those skilled in the art would recognize that several peripheral devices are available for various types of remote terminals 12 that could be used to input data into the remote terminals 12 and may be taken advantage of by the present invention.

Preferentially, the wireless communication system 14 is a digital communication system that uses one of several different methods of providing wireless digital communication between the remote terminals 12 and the base stations 16. The wireless communication system 14 can use frequency division duplexing (FDD) or time division duplexing (TDD) to allocate for the two directions of transmission between the remote terminal 12 and the base station 16.

In order to provide multiple access methods to the remote terminals 12, which refers to the method of creating multiple channels for each transmission direction, one of several different types of multiple access methods may be used in the present invention. Three preferred types of multiple access methods that might be used include: frequency division multiple access (FDMA); time division multiple access (TDMA); and/or code division multiple access (CDMA). Those skilled in the art would recognize that the present invention could readily be adapted to take advantage of other multiple access methods as well.

As further illustrated in FIG. 1, in the preferred embodiment of the present invention the base station 16 of the wireless communication system 14 is connected to a public switched telephone network (PSTN) 18 by a public switch 20. As known to those skilled in the art, the PSTN 18 is a worldwide voice telephone network that is used to allow various communication devices to communicate with each other. Although the preferred PSTN 18 is a digital system, the present invention may be adapted for use on analog systems as well to accommodate geographic regions that might be underdeveloped or not serviced by a digital system.

The public switch 20 transfers the signals that are received from the base station 16 to a private branch exchange (PBX) 22. The public switch 20 is connected to the private branch exchange (PBX) 22, which, as generally known in the art, is a telephone switching system that is used to interconnect various telephone extensions to each other. In the preferred embodiment of the present invention, the PBX 22 uses all-digital methods for switching and is capable of supporting digital remote terminals and telephones and analog remote terminals and telephones. As set forth in greater detail below, in the preferred embodiment, the PBX 22 is connected to a server of the location-based services system 10, which is a form of a digital remote terminal.

Referring to FIG. 1, in this embodiment of the present invention, the PBX 22 is connected to at least one voice recognition server 24. The voice recognition server 24 contains at least one voice recognition application that is operable to recognize the respective words that are contained in the voice signals that are received from the PBX 22. As set forth in greater detail below, a resulting output is generated by the voice recognition application that is used by a natural language processing application.

The voice recognition server 24 is connected to at least one natural language processing server 26 that includes at least one natural language processing application that processes the identified words contained in the voice signals to ascertain the meaning of the words that are contained in the voice signals. As such, during operation, the voice recognition server 24 identifies or recognizes the particular words that are contained in the voice signals and the natural language processing server 26 interprets the meaning of the recognized words of the voice signals that are originally generated from the remote terminal 12. The natural language processing application may be located on the voice recognition server 24 in other embodiments of the present invention, but, in an effort to increase the level of performance, would preferentially be located on a separate server or a separate set of servers.

The natural language processing server 26 is connected to at least one location-based application server 28. As set forth in detail below, the location-based application server 28 is programmed to provide responsive information to the remote terminals 12 that has been requested by a respective user of the remote terminal 12. Generally speaking, the location-based application server 28 is used to retrieve and pass on location-based information to the remote terminals 12 in various data formats. The type of information provided to the remote terminals 12 varies depending on the specific nature of the information that has been requested from the user and the geographic location of the remote terminal 12.

During operation, after the meaning of the words in the voice signals are interpreted, the natural language processing server 26 is programmed to create a structured request that is sent to the location-based application server 28. In response to the structured request, the location-based application server 28 generates a structured response that is sent to the remote terminal 12. As set forth in greater detail below, the exact nature of the information sent in the structured response depends on the specific request that is made by a particular user of the remote terminal 12.

If an analog voice signal is used, although not illustrated in FIG. 1, at least one digital signal processor server could be used to convert the analog signal into a digital signal that the voice recognition server 24 can process and interpret using the voice recognition applications. In this respective embodiment, the digital signal processor server is preferentially connected between the voice recognition server 24 and the PBX 22. Those skilled in the art would recognize that the voice recognition server 24 might also be designed to perform the functions of the digital signal processor server in other embodiments of the present invention.

Each remote terminal 12 also sends a unique remote terminal identifier to the base station 16 while communicating with the base station 16 of the wireless communication system 14. The remote terminal identifier is preferentially attached to each voice signal as it passes through the location-based services system 10 so that the system can keep track of which respective remote terminal 12 is supposed to receive the information that has been requested. Those skilled in the art would recognize that various identification methods might be used to keep track of specific remote terminals 12 using the location-based services system 10.

As further illustrated in FIG. 1, the location-based application server 28 is also connected to a location gateway server 30, which is, in turn, connected to the base station 16 of the wireless communication system 14. The location gateway server 30 is used by the location-based application server 28 to retrieve a geographic indicator that is associated with each respective remote terminal 12. As such, while a respective remote terminal 12 is connected to the wireless communication system 14, the location-based application server 28 is capable of determining the respective geographic location of the remote terminal 12 so that geographically targeted responses and information can be provided to the remote terminal 12.

As illustrated in FIG. 1, the location gateway server 30 is preferentially connected to the base station 16 of the wireless communication system 14 using a network connection 32, which may be a private network connection or an Internet connection in alternative embodiments of the present invention. The geographic indicator may be generated by the remote terminal 12 or the base station 16 and is preferentially transmitted to the location-based application server 28 when a user of the remote terminal 12 is accessing the location-based services system 10. The geographic indicator is preferentially transmitted to the location-based application server 28 with the remote terminal identifier so that the location-based application server 28 can associate each respective remote terminal 12 with a particular geographic location.

In the preferred embodiment of the present invention, the geographic indicator may be preset by a user of the remote terminal 12, automatically generated by a GPS located in the remote terminal 12 or generated by a specialized geographic determination application running on the base station 16. In addition, the present invention may advantageously take advantage of an enhanced 911 system of the wireless communication system 14 to generate the geographic indicator. In another embodiment of this invention, the geographic indicator may originate from a combination of these sources and/or systems (i.e. it could come from a GPS-assisted network that uses GPS and devices on the network). The geographic indicator may automatically be sent to the location-based application server 28 as soon as a respective remote terminal 12 connects to the wireless communication system 14; however, in alternative embodiments of the present invention, the geographic indicator is only sent when a respective remote terminal is sending a structured request to the location-based application server 28. As the geographic location of the remote terminal 12 changes, the geographic indicator is updated and the updated information can continuously be sent to the location-based application server 28.

As further illustrated in FIG. 1, at least one voice synthesis server 33 is connected to the location-based application server 28 and the PBX 22. For voice-related applications of the location-based services system 10, the voice synthesis server 33 is used to generate voice responses that are based on the structured responses that are generated in response to the structure requests that are received by the location-based application server 28. Voice synthesis applications on the voice synthesis server 33 are used to transform the structured responses into voice response. In the preferred embodiment, the PBX 22 is used to transmit the voice responses to the PSTN 18, which, in turn, transmits the voice response to the base station 16, which ultimately transmits the voice response on to the remote terminal 12. In alternative embodiments of the present invention, the voice synthesis server 33 may be connected directly to respective base stations 16 of the wireless communication system 14.

Referring once again to FIG. 1, in yet another preferred embodiment of the present invention, the remote terminal 12 is connected to the location-based application server 28 through a wireless application protocol (WAP) gateway 34 of the wireless communication system 14. The WAP gateway 34 is connected to a WAP server 38 of the location-based services system 10 through a network connection 36. The network connection 36 may be a private network connection or an Internet connection. The WAP server 38 is connected to the location-based application server 28 and, during operation, is used to generate structured requests, which are based on requests that are input to the remote terminal 12 and sent to the location-based application server 28.

The remote terminal 12 is capable of communicating with the WAP server 38 and the location-based application server 28 using a WAP standard. As known to those skilled in the art, the WAP standard is a protocol that is designed for wireless communication devices to provide secure access to e-mail and text-based web pages. WAP provides a complete environment for wireless applications that includes a wireless counterpart of TCP/IP and a framework for telephony integration. In the preferred embodiment of the location-based services system 10, the remote terminals 12 may also be capable of browsing for location-based services through the use of text and graphical based menus that can be provided to the remote terminals 12 from the location-based application server 28.

One preferred embodiment of the present invention uses the WAP standard to support the use of a Wireless Markup Language (WML), which is a streamlined version of HTML for small screen displays, to conduct communication and transfer information between the remote terminal 12 and the location-based application server 28. WAP is also capable of using WMLScript, which is a compact JavaScript-like language that is capable of running in limited memory on the remote terminal 12. The location-based services system 10 can also be designed to advantageously take advantage of this capability to provide location-based services to users of remote terminals 12 depending the particular geographic location of the remote terminal 12.

In this preferred embodiment of the present invention, the WAP standard supports various handheld input methods such as keypad inputs or pointer device inputs that may be generated on various different types of remote terminals 12. As it relates to the present invention, this gives users of the remote terminals 12 the capability of inputting data from keypads for the purposes of entering search requests to the location-based services system 10. In addition, the remote terminals 12 are capable of receiving, interpreting and displaying web pages that include hypertext links to other web pages that may be selected using various selection methods.

For the purpose of the present invention, the term wireless application protocol should be broadly construed to include any communication protocol similar to what is commonly referred to as the "WAP standard," which, as set forth above, is used to transmit text and graphics-based information to remote terminals 12. Although the WAP standard is used in this particular preferred embodiment of the present invention, those skilled in the art should recognize that other text and graphics-based communication protocols could be used in alternative embodiments of the present invention.

For example, although not specifically illustrated, another preferred embodiment of the present invention could be designed for an i-Mode wireless communication system. i-Mode wireless communication systems use a packet-based communication protocol to communicate between the remote terminals 12 and the base station 16, which essentially means that the remote terminals 12 are connected to the wireless communication system at all times and communicate with the base stations 16 using packets. i-Mode is also capable of providing web-browsing and customized applications to remote terminals 12.

i-Mode is a proprietary system that uses a subset of HTML, known as cHTML, in contrast to the WAP standard, which uses WML. In this particular embodiment, an i-Mode server is used to connect the base station 16 of the wireless communication system 14 to the location-based application server 28. The remaining details of this particular embodiment are similar to other embodiments of the present invention and, as such, a more detailed discussion is not necessary.

Referring to FIG. 1, in yet another preferred embodiment of the location-based services system 10, a second remote terminal 40 is connected to a subscriber portal web server 44 through a network connection 42. The network connection 42 may be a private network connection or an Internet connection. As illustrated, the subscriber portal web server 44 is also connected to the location-based application server 28. During operation, the second remote terminal 40 is programmed to receive structured requests that are sent to the location-based application server 28 and, likewise, the location-based application server 28 is programmed to generate structured responses that are sent to the second remote terminal 40.

The second remote terminal 40 and the location-based application server 28 preferentially communicate with each other using standard web-based protocols that are commonly used in various Internet-based applications. In this embodiment of the present invention, a user accesses the subscriber portal web server 44 through the second remote terminal 40, which is preferentially a computer workstation. As a subscriber to the location-based services system 10, the second remote terminal 40 is assigned a predetermined geographic indicator. The geographic indicator is used by the location-based application server 28 to target services and business content to the second remote terminal 40 that are based on the geographic location of the second remote terminal 40.

The user of the second remote terminal 40 may be given the option of setting the geographic indicator to a desired geographic location, which may or may not be the exact geographic location of the second remote terminal 40. For example, if the user is traveling to another city that evening and wants to access location-based services in that particular city, an option can be provided allowing the second remote terminal 40 to designate that particular city.

In this preferred embodiment of the present invention, the second remote terminal 40 is preferentially a computer workstation that includes multimedia capabilities and includes a microphone and a sound card. As known to those skilled in the art, this allows the second remote terminal 40 to generate sound through a speaker system and receive voice signals through the microphone. Although not specifically illustrated in FIG. 1, this could allow the subscriber portal web server 44 to be connected to the voice recognition server 24 so that voice signals sent from the second remote terminal 40 could be processed similar to the method used to process voice signals received from wireless remote terminal 12.

Referring to FIG. 1, a business remote terminal 46 is connected to a network connection 48 that is connected to an advertiser portal web server 50. The network connection 48 may be a private network connection or an Internet connection. The advertiser portal web server 50 allows various businesses (i.e., content providers) to add, modify and/or delete campaigns that are designed to promote and sell various products and services through the location-based services system 10. For example, if a particular business entity desires to run a promotion on a particular product or service, the advertiser portal web server 50 allows the business entity to modify their respective listings to include the respective items or services on special.

As further illustrated in FIG. 1, the preferred location-based services system 10 is also capable of leveraging data that is preferentially grouped in four logical data groupings 52. These logical data groupings include profile data files 54, business data files 56, additional data files 58 and usage data files 60. The data files 54-60 contain detailed information on various items and services that are used by the location-based services system 10, which is set forth in detail below. The data files 54-60 can be located on the location-based application server 28, but are preferentially maintained on separate servers.

The profile data files 54 contain a group of logical entities that contain relevant information concerning each consumer of the location-based services system 10. These logical entities include, but are not specifically limited to the following items: consumer name; consumer phone number; consumer identification; consumer password; consumer home address; consumer home phone number; consumer email address; consumer pager number; consumer service subscriptions (detailing the consumers chosen level of participation in one or more services); consumer privacy preferences (detailing information denoting the willingness to share a consumers private data with others based on data type, requester, service, etc.); consumer service preferences (detailing any specific saved information that is relevant to any of the services which a consumer may use, such as: named locations (such as the address for a consumers work location, or the address(es) of a consumers friend(s); named interests or preferences regarding hobbies, news topic interest, sports, music, preferred brands or chains, banking information and other demographic information. (such as NBA basketball, Jazz music, Italian food, favorite clothing brands or chains, banking information, etc.)); and preferred asynchronous communication method (such as email or pager) listed by service and/or service/content provider.

The business data files 56 are composed of a group of logical entities containing all relevant information regarding the businesses listed within the location-based services system 10, including but not limited to: business name; business phone number; business text description; business audio description; business video description; business and/or product images; business identification; business password; business category or categories; advertising participation level; advertising campaign information such as: parameters that define target market; campaign identification code; advertising content and special deals/discounts; saved data mining/reporting parameters; brands sold; brands serviced; product types sold; product types serviced; product models sold; product models serviced; product model prices; and service prices and inventory list (by brand, product type and product model).

The additional data files 58 contains a group of logical entities that generally includes any additional content that is capable of being leveraged by the location-based services system 10, possibly including, but not limited to: business ratings (via external evaluation services); weather conditions; driving directions; maps; traffic Although not specifically illustrated, the residential telephone number and address listings may be provided by local telephone companies through a residential listing server that is connected to the location-based application server 28.

The usage data files 60 contains a group of logical entities that generally includes all recorded information regarding consumer transactions from remote terminals 12, 40, possibly including, but not limited to: consumer identification (or a unique hash of consumer identification); date; time; service used; request type; search criteria; matched data purchases made, and actions taken. Those skilled in the art would recognize that several other types of usage data might be stored in the usage data files 60.

As generally set forth above, users of the location-based services system 10 are given the ability to search, via a remote terminal 12, 40, for a business that will satisfy specific purchase or service requirements using multiple access methods (voice, wireless application protocol or web application protocol). The location-based application server 28 is programmed to handle a variety of structured requests and is capable of generating a variety of structured responses in the same format (i.e.—voice, wireless application protocol or web application protocol) that the structured request was received by the location-based application server 28.

Some of the structured request parameters that are capable of being used for the business services provided by the location-based services system 10 include (but are not necessarily limited to) one or more of the following: product type; service type; business name; business category; product name (or model name); product brand; price level; business or service ratings (i.e. external evaluation from a rating service such as AAA); whether special deals are provided; location (auto-location (locating nearest ATM for instance), predefined locations, or consumer-specified locations); hours of operation; availability of service (for example: availability of a open table at a specified time at a restaurant); and company specified within favorites for a category (i.e., name of favorite coffee house franchise). Those skilled in the art would recognize that a variety of structured request parameters might be used in the present invention.

Optionally, consumers have the ability to "opt-in" to "push" content and advertising services. Push services are defined as services, which proactively deliver content to the consumer through the remote terminal 12, 40, rather than services delivered only following a request by the consumer. As set forth above, the preferences of the consumers that use the remote terminals 12 are stored within the profile data files 54. As such, by way of example only, a consumer that likes golf may be "pushed" an offering as they travel close to a nearby golf equipment store relating to a special offer on an item such as a golf club or particular brand of golf ball.

As set forth briefly above, the location-based services system 10 also gives businesses the ability to manage their respective content and mine usage data by using the advertiser portal web server 50. The advertiser portal web server 50 preferentially includes the following web-based applications: a campaign management application, a business profile management application, a mining/reporting and predictive modeling application. Each of these applications and their respective functional aspects is discussed in greater detail below.

The campaign management application includes several applications that allow a business to create advertising campaigns and an edit/delete advertising campaigns. The create campaign capability enables an advertiser to create a location-based advertising campaign. As part of this capability, the business would define the market segment at which the advertising is targeted. Then, the advertiser would define the advertising content that would be delivered to the target market, as well as the mechanism of delivery (i.e. pushed to each consumers remote terminal 12, 40, or presented only to a consumer when they make a relevant enhanced directory assistance request/search). The edit/delete campaign capability allows the business to modify or delete an existing campaign that has already been created and is running on the location-based application server 28.

The business profile management application includes a create business listing capability and an edit business listing capability. The create business listing capability enables a business to define their respective set of business data (see above for a list of content within the business data). The edit business listing capability allows the business to modify or delete their business listing. Those skilled in the art would recognize that several other options might be made available through the business profile management application.

The mining/reporting capability allows business to interface with data that is stored in the usage data files 60. An advertising effectiveness interface utilizes the usage data files 60 and business data files 56 to generate analysis surrounding the effectiveness of location-based advertising campaigns. The analysis will address questions such as "How many people received my campaign in the downtown area of Atlanta". The information provided to the businesses provides them insight to quantify the results of campaigns created in the location-based services system 10 through the campaign management tool.

The predictive modeling capability provides forecasting for potential customers likely to respond to offers, listings and deals. Examples of the type of feedback the consumer will receive include (but not limited to) the following: identifying customers likely to respond to their campaign by customer segment; identifying customers likely to request a campaign or listing by customer segment; and identifying demands by peak time or day.

As briefly set forth above, the location-based services system 10 provides a consumer using a remote terminal 12, 40 with access to products and services in a designated geographic area through multiple access methods such as voice, wireless application protocols (such as WAP and cHTML) and web protocols (such as Java and HTML). The present invention encompasses the full lifecycle of the location-based services system 10 including delivery and maintenance, which includes content management, consumer management, content delivery, advertising management, advertising reporting, advertising delivery, usage tracking, usage mining and reporting, billing and settlements.

The preferred location-based services system 10 is capable of providing location-based services to consumers through remote terminals 12, 40 and is managed by various content providers through the use of respective business remote terminals 46. The services that are provided through the location-based services system 10 preferentially includes an enhanced directory assistance service and an enhanced business service that is delivered through a voice recognition capability, wireless application protocol capability and/or web application capability.

In order to access the enhanced directory assistance services or the business services, the user of the remote terminal 12 preferentially enters a predetermined key sequence (e.g.— by pressing 411) on the keypad of the remote terminal 12 or by pressing a specially designed key on the remote terminal 12. If the remote terminal is not connected to the base station 16 already, when the enhanced directory assistance services or business services are selected, the remote terminal 12 establishes a connection with the base station 16 of the wireless communication system 14, which acts as a gateway to the location-based services system 10.

In another embodiment, in order to select one of the respective services, the user of the remote terminal 12 is given the option of using voice commands, but as previously set forth may also use keypad inputs on the remote terminal 12 to select the desired services as well. Those skilled in the art should recognize that the enhanced directory assistance services and the business services do not necessarily have to be provided through the same access method and that a keypad-based menu system may be used until the appropriate time occurs for the user to input a voice signal containing a request for information.

By way of example only, if the enhanced directory assistance services are selected by a user of the remote terminal 12, either the base station 16, the location-based application server 28 or remote terminal 12 can be programmed to generate a search parameter request that is audibly generated on the remote terminal 12. In the embodiment being discussed, the search parameter request is sent in the form of a voice signal that prompts the user to state the first and last name of the person they are looking for. In addition, the search parameter request could also include an option that might prompt to user to also state the geographic area where the person is located. As should be apparent from the discussion above, since the location-based services system 10 includes voice recognition applications, those skilled in the art should recognize that the entire process of entering the search parameter request may be done by voice signals generated on the remote terminals 12.

In response to the search parameter request that is generated on the remote terminal 12, the user preferentially provides a vocal response to the remote terminal that is transmitted to the base station 16. The vocal response preferentially includes a first name response and a last name response (and possibly a detailed geographic information response for non-local listings) of the particular person the user is looking to retrieve information on. The vocal response to the search parameter request, which preferentially also includes a unique remote terminal identifier that is associated with each respective remote terminal 12, is then sent from the remote terminal 12 to the base station 16. The base station 16 transmits the voice response to the PSTN 18, which then routes the vocal response, together with the remote terminal identifier, to the PBX 22.

The PBX 22 transmits the vocal response and the remote terminal identifier as inputs to voice recognition applications and natural language processing applications that are located on servers 24, 26, which in turn, respectively transform the vocal response and the remote terminal identifier into a structured residential listing request that is sent to the location-based application server 28. As set forth in detail above, the voice recognition applications analyze the vocal responses for the purposes of making a determination of the identity of particular words contained in the vocal responses. Any detailed geographic information provided by the user is also added to the structured residential listing request that is sent to the location-based application server 28.

Figure 2:
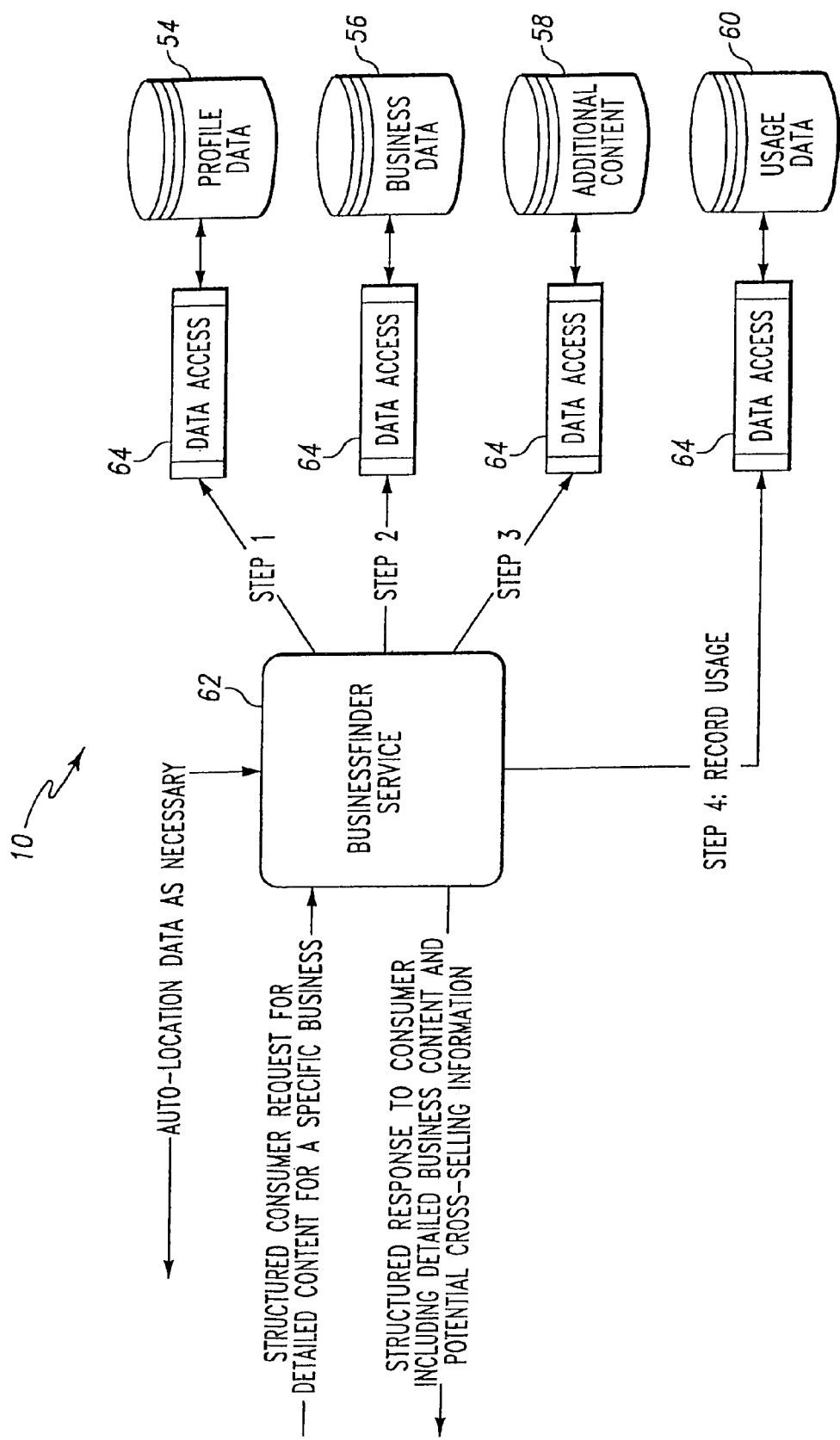
FIG. 2 is a flow chart illustrating the process steps performed by the location-based application server when processing structured requests.

As illustrated in FIG. 2, the structured residential listing request is used as an input to a residential finder application 62 located on the location-based application server 28. During operation, the residential finder application 62 interprets the structured residential listing request and uses at least one data access routine 64 to locate and retrieve the specific information requested by the structure residential listing request from a respective database file 54-58. Those skilled in the art should recognize that several database servers may be connected to the location-based application server 28 that are used to store various forms of information and content that is provided to users by the location-based services system 10 in varying types of formats, which will be set forth in greater detail below.

In the preferred embodiment of the present invention, the residential finder application 62 matches up the structured residential listing request with the geographic indicator of the remote terminal 12. If no geographic information is contained in the structured response, the residential finder application 62 conducts a search of the profile data files 54 and the additional data files 58 with data access routines 64 targeted within a predetermined area based on the geographic location of remote terminal 12. If geographic information is included in the vocal response, the residential finder application 62 conducts a search within the geographic area specified by the user. As set forth above, in the preferred embodiment of the present invention the residential listing database files are stored under the additional data files 58 by way of example only and should not be construed as a limitation of the present invention.

The residential finder application 62 preferentially also searches the profile data files 54 so that if the identity of the person contained in the structured residential request is identified as a subscriber of the location-based services system 10, a remote terminal 12 telephone number and/or an email address may also be added to the response that is provided to the user requesting the desired information. If the located person does turn out to be a subscriber of the location-based services system 10, other embodiments of the present invention allow the subscriber to create a personalized response that is stored in a database file and is provided in response to residential listing requests that identify them.

In addition to receiving the structured residential listing requests, the residential finder application 62 obtains a geographic indicator and a remote terminal identifier associated with the remote terminal 12. This allows the system to default to the geographic location of the remote terminal 12 to conduct the search, as set forth above. For instance, if the remote terminal 12 is located in Atlanta, Ga., the residential finder application 62 will know this from the geographic indicator and will only search listings in the Atlanta area.

Once the appropriate data is located by the residential finder application 62 that is responsive to the structured residential listing request, which in the present example would preferentially include at least one telephone number and/or the address of the person(s) named in the voice signal, the residential finder application 62 is operable to generate a structured residential response that is sent to voice synthesis server 33. As set forth in detail above, the voice synthesis server 33 is programmed to transform the structured residential response into a voice response signal with voice synthesis applications located on the voice synthesis server 33.

As set forth briefly above, the voice response that are generated by the voice synthesis server 33 can include the name, address, residential telephone number, mobile number and/or email address of the particular person for which the user has requested a residential listing. For those instances where the structured residential responses include more than one residential listing, the residential listing finder application 62 is preferentially programmed to generate a structured residential response that provides the multiple listing results in a predetermined organized listing arrangement.

The predetermined organized listing arrangement is preferentially set up so that the user of the remote terminal 12 is capable of interacting with the listings provided in the voice response through the use of a keypad input or by voice signals that are spoken into the remote terminal 12 by the user. Preferentially, the information is organized and presented to the user of the remote terminal 12 based on the address of the particular people identified by the residential finder application 62, however, those skilled in the art would recognize that other alternatives of presenting and organizing the results exist (i.e.—ranking the results in geographic order) are capable of being used in varying embodiments of the present invention.

If the person for whom information has been requested is designated as being unlisted or unavailable, the location-based application server 28 is preferentially programmed to generate a structured residential response that contains a message that indicates that the requested information is unlisted or unavailable. As such, in this particular embodiment of the present invention the location-based application server 28 sends the structured residential response to the voice synthesis server 33, which generates a voice signal that is sent to the remote terminal 12 informing the user that requested the residential listing that the requested residential listing it unlisted or unavailable.

As briefly set forth above, another preferred embodiment of the location-based services system 10 is capable of providing business services to the remote terminal 12, which are provided to the remote terminal 12 based on the geographic location of the remote terminal 12. If the user of the remote terminal 12 selects the business services option instead of the enhanced directory assistance services option, a variety of information services are capable of being delivered to the user through the location-based services system 10. During operation, the business services are provided to the remote terminal 12 through similar access methods that the residential listing services are provided to the remote terminal 12. In addition to being able to obtain the address and telephone number of local businesses, various other forms of business information is capable of being transmitted to the remote terminal 12 by the location-based services system 10.

As generally set forth above and in greater detail below, some of the preferred structured business request parameters that are capable of being processed by the business services of the location-based services system 10 include (but are not necessarily limited to) one or more of the following parameters: product/service types; business names; business category; product name (or model name); product brands; price level; business or service ratings (e.g.—external evaluation from a rating service such as AAA); whether special deals or offers are being provided; auto-location of predefined services (e.g.—locating the nearest ATM for instance); hours of operation; availability of service (e.g.—availability of a open table at a specified time at a restaurant); and/or business information specified within a user defined favorites category (e.g.—name of favorite coffee house franchise, favorite clothing brands, favorite restaurants).

In this preferred embodiment of the present invention, once a user of the remote terminal 12 gains access to the business services provided by the location-based services system 10, they are prompted by a voice signal requesting the user to state their respective business request. In response to the prompt for a business request, the user states a vocal response that is received by the remote terminal 12 that contains a predetermined request for a predetermined type of business content. The exact nature and content of the vocal response will vary, depending on the specific type of business/service information that is being requested by the user of the remote terminal 12. As set forth above and below, the preferred embodiment of the present invention includes natural language processing applications the are used to interpret the meaning and context of the words contained in the vocal response, thereby allowing the user of the remote terminal 12 to make a request using requests that are spoken using statements commonly used in everyday conversations.

By way of example only, lets say that a respective user of the remote terminal 12 wants to obtain business information related to determining the location of a favorite local fast-food restaurant. As such, the user's vocal response that is received by the remote terminal 12 might contain a voice signal that includes a request for business information that could be phrased something along the lines of the following statement: "What is the address of a Burger King restaurant that is close to my present location?" As previously set forth, this preferred embodiment of the present invention is capable of interpreting this request using natural language processing applications to generate a structured response.

As with the residential services, in this embodiment of the present invention the vocal response that is provided by the user of the remote terminal 12 is transmitted from the remote terminal 12 to the base station 16 of the wireless communication system 14, which in turn is operable to transmit the vocal response to the PSTN 18 that transmits the vocal response to the PBX 22. The vocal response is then sent from the PBX 22 to the voice recognition server 24 where it is processed with voice recognition applications to determine the identity or recognize the respective words that are contained in the vocal response from the user containing a business information request. Although not illustrated, in an alternative embodiment of the present invention the base station 16 is directly connected to the voice recognition server 24, thereby allowing the base station 16 to directly transmit vocal response to the voice recognition server 24.

After the words contained in the vocal response have been recognized using voice recognition applications, a respective output is generated by the voice recognition applications, which is used as an input to natural language processing applications. As set forth in detail above, the natural language processing applications determine the meaning and context of the words contained in the vocal response that is received by the remote terminal 12. Referring once again to FIG. 2, once the meaning and context of the recognized words contained in the vocal response have been determined, the natural language application is programmed to generate a structured business request that is sent to the location-based application server 28. The location-based application server 28 includes at least one business/services finder application 62 that is operable to process the structured business request by retrieving the requested information.

As set forth in detail above, the remote terminal 12 also sends a remote terminal identifier with the vocal response that is preferentially integrated in some manner with the structured business request that is ultimately generated and sent to the location-based application server 28. In addition, in this preferred embodiment of the present invention as well as others, a geographic indicator and a remote terminal identifier associated with the respective remote terminal 12 making the structured business request is also obtained or has already been obtained by the location-based application server 28. As illustrated in FIG. 2, the geographic indicator and the structured business request are used by the business/services finder application 62 to generate a structured business response that is responsive to the structured business request.

In our current example, the preferred business/services finder application 62 uses the geographic indicator of the remote terminal 12 to determine which particular Burger King location is closest to remote terminal 12. A mapping routine within the business/services finder application 62 compares the geographic location of the remote terminal 12 with the respective geographic locations of Burger King restaurants retrieved by the structured business request and makes the determination of which location is closest to the remote terminal 12, which can be based on the distance of the remote terminal 12 from each respective location. As illustrated in FIG. 2, this is accomplished by a data access routine 64 that accesses the appropriate information from the business data files 56, which preferentially contains a database of business listings, addresses, products and/or services provided.

After the appropriate information is located, the location-based application server 28 is programmed to generate a structured business response that is sent to the voice synthesis server 33. The voice synthesis server 33 converts the structured business response into a voice signal that is then sent to remote terminal 12. In this example, the structured business response would contain the address of the Burger King that is closest to remote terminal 12, which has been determined by the location-based application server 28 based on the geographic location of remote terminal 12.

In yet another example of this embodiment of the present invention, a user of the business services might request information on a retail store that sells a specific product or provides a specific service. For instance, a user might state: "Who sells or provides product/service (stating the particular product/service desired)?" After the voice recognition application and the natural language processing application interpret and transform the request into a structured business request, the business/services finder application 62 uses the geographic indicator of remote terminal 12 to narrow the structured business request to retrieve business information contained within a predefined geographic area in which the remote terminal 12 is located. If more than one business sells the item or provides the requested service, the business/services finder application 62 is programmed to generate a structured business response that is sent to voice synthesis server 33 containing a listing of the respective businesses meeting the desired criteria.

In yet another preferred embodiment of the present invention, the user is able to access the location-based services system 10 by using a wireless application protocol to generate and transmit structured requests to the location-based application server 28. A user of remote terminal 12 uses a keypad or some other equivalent input means to access the location-based services system 10 from a selection menu that is generated on a display of remote terminal 12. In this preferred embodiment of the present invention, once a user chooses to obtain access to the location-based services system 10, the remote terminal 12 is preferentially programmed to display a selection menu that contains a link to the business services and residential listing services provided by the location-based services system 10. Those skilled in the art would recognize that various predefined links and menu selections for various types of services may also be displayed that may or may not be specified by the user of remote terminal 12.

If the residential listing service is selected on the remote terminal 12, the user is prompted by remote terminal 12 to enter the first and last name of the person for which they desire to obtain information. By default, the remote terminal 12 is preferentially programmed to search for a listing that is contained in the immediate geographic location of the remote terminal 12. For example, if remote terminal 12 is located in the Atlanta metropolitan area, the search will be preset to be conducted using the Atlanta residential listings database. In alternative embodiments of the present invention, an additional input area is provided on the display of the remote terminal 12 whereby the user may designate the particular geographic location to search (i.e.—a city and state input location). As apparent, this allows the user to vary the location searched based on user preferences thereby providing further benefits to the user.

An additional item the remote terminal 12 is programmed to generate on the display is an icon or a selection area that is designated to cause the remote terminal 12 to transmit the search request, which contain the parameters that have been input by the user, to the base station 16 of the wireless communication system 14. As previously set forth, preferentially the search request is sent to the base station 16 using a wireless application protocol, which for the purpose of the present invention should be broadly construed to include a broad range of standards used by various wireless communication systems 14. The remote terminal 12 also transmits a remote terminal identifier with the search request, which as previously set forth, is assigned to remote terminals 12 for identification purposes. Once received by the base station 16, the search request is directed to the WAP gateway 34, which in turn, is preferentially programmed to transmit all search requests that are received by users accessing the location-based services system 10 to the WAP server 38.

The WAP server 38 is programmed to interpret the search request and generate a structured residential request that is sent to the location-based application server 28. For identification purposes, the remote terminal identifier is also transmitted to the location-based application server 28 with the structured residential request. As with other embodiments of the present invention, the location-based application server 28 is programmed with a residential finder application 62 that uses one of several data access routines 64 to obtain the requested information from a respective database file 54-58. A structured response is then sent to the WAP server 38, which in turn transmits the structured response to the WAP gateway 34 and ultimately on to the remote terminal 12.

If the business services option is selected, the remote terminal 12 prompts the user for a search request, which the user enters on the remote terminal 12. The search request is then sent to the location-based application server 28, in a similar fashion as described with the directory assistance services, where it is processed by a business/services finder application 62. The business/services finder application 62 uses data access routines 64 to retrieve the desired information and generates a structured response that is based on the geographic location of the remote terminal 12.

For example, if the remote terminal 12 is located on the upper north side of Atlanta, Ga., the location-based application server 28 will be informed of this fact by receiving a geographic indicator from the second remote terminal 12 and will be operable to generate structured responses to structured requests that contain information that is targeted for that particular geographic location. For instance, if a user of the remote terminal 12 enters a search request for information on "Chinese restaurants running specials", a structured response is generated by the business/services finder application 62 that provides information about Chinese restaurants on the upper north side of Atlanta, and not Chinese restaurants located in irrelevant geographic locations, such as the far south side of Atlanta.

As previously set forth, in yet another preferred embodiment of the location-based services system 10 a user of the second remote terminal 40 is connected to a subscriber web portal server 44. The second remote terminal 40 and the subscriber web portal server 44 are designed to communicate with each other using standard web-based protocols (e.g.— HTML). The subscriber web portal server 44 is connected to the location-based application server 28, thereby providing the second remote terminal 40 with access to the business services and enhanced directory assistance services that are offered in the preferred embodiments of the present invention.

The second remote terminal 40 is capable of providing voice or keypad input data to the subscriber web portal server 44. As previously set forth, for voice signals the respective vocal responses are sent to the voice recognition servers 24 for processing and, in the case of keypad input data, the subscriber portal web server 44 is operable to generate structured requests in response to user requests received from the second remote terminal 40 in similar manners as set forth above. The preferred location-based services system 10 is capable of allowing its subscribers to take advantage of the services provided by the present invention in a non-wireless environment as well, by supporting the use of standard computing devices that are typically used at home or work.

As such, by way of example only, lets say a user of the second remote terminal 40 is located in Atlanta, Ga., and wants to find local deals on Polo merchandise as well as stores that carry this particular brand that are located near their respective geographic location. In the case of a keypad input search, the user would be prompted for a search request from a web page generated on the second remote terminal 40 where they would enter their desired search parameters, which in the present example might be in the form of the words "POLO MERCHANDISE".

After the search request is entered and the user is ready to send the request, there is also preferentially an icon or some other type of selection indicator that is generated on a web page being displayed on the second remote terminal 40 that allows the user to submit the request. Once this is selected, the search request, a second remote terminal identifier and a geographic indicator are sent to the subscriber web portal server 44. The subscriber web portal server 44 then transforms the search request into a structured search request that is sent to the location-based application server 28, which processes the structured request similar to other embodiments of the present invention.

In the case of a voice signal input being used, the user would be prompted to state their respective request much like in the example set forth above with relation to wireless remote terminal 12. As such, in the case of our present example, the user might state "POLO MERCHANDISE" after being prompted for a business services request. This vocal response is sent to the voice recognition server 24, which as previously set forth, processes the vocal response similar to other embodiments herein described.

As such, in our present example, a user of the second remote terminal 40 would be provided with a structured response from the location-based application server 28 that contained information relating to businesses that sell Polo merchandise in a geographic location that is relatively close to the second remote terminal 40. In fact, in every embodiment of the present invention, the user may also be given option of selecting a predetermined geographic radius for which they wish responses to be generated during operation. By way of example only, a respective user may only desire to obtain information on businesses located within 15 miles of the remote terminals 12, 40 and as such, may set a setting provided on the remote terminal 12, 40 that only allows responses to business services requests to be generated within a 15 mile radius of the remote terminal 12, 40.

Referring once again to FIG. 1, a wireless carrier 70 may also be connected to the data files 54-60 through a wireless carrier server 72. The wireless carrier server 72 is preferentially operable to monitor the data that is contained in the data files 54-60. As such, during operation of the location-based services system 10 the wireless carrier server 72 can update a subscriber data file 74 as users of the remote terminals 12, 40 access the location-based services system 10. This allows the wireless carrier 70 to keep track of the usage of the location-based services system 10 and may allow various charges to be applied to the user if applicable.

Referring to FIG. 1, in yet another preferred embodiment of the present invention advertiser subscribers using remote terminal 46 are provided with a usage mining system 100. The usage mining system 100 provides the ability to research usage trends and transactions of the location-based service system 10 via a web application. In FIG. 1, the advertiser preferentially accesses this capability via the advertiser portal 50 using a web browser at business remote terminal 46, which preferentially would serve as a gateway to the application platform. The advertiser portal 50 provides a user of business remote terminal 46 with the ability to access and retrieve data that is stored in the usage data files 60.

Figure 3:
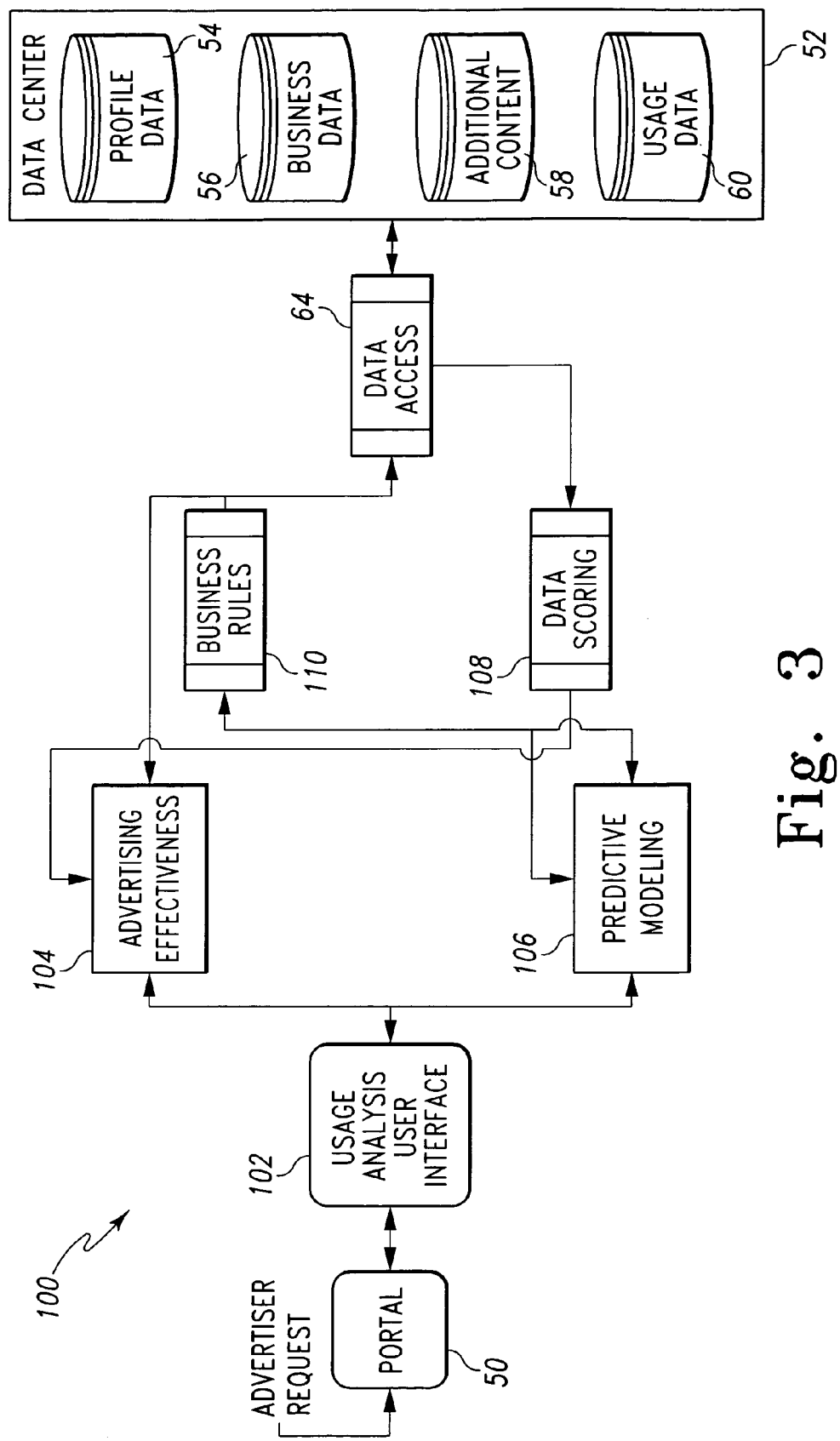
FIG. 3 illustrates a preferred method for searching usage information in a location-based services system.

Referring to FIG. 3, a preferred embodiment of the present invention includes a usage analysis user interface 102 that preferentially provides a web-based user interface to the usage mining system 100. Using the usage analysis user interface 102, the advertiser is able to select a first analysis option that generates detailed usage analysis from the location-based services system 10. The usage mining system 100 will preferentially generate analysis based on two categories of analysis options. The preferred analysis options include (but are not limited to) an advertising effectiveness analysis application 104 and a predictive modeling application 106. During operation, the user will select fields within each application 104, 106 to create a search query. Based on the inputs, the application 104, 106 will determine the necessary components to access in order to generate the correct analysis. Although not illustrated, a general search query may also be provided that allows the user to search the entire usage database 60 based on searching predetermined parameters.

Figure 4:
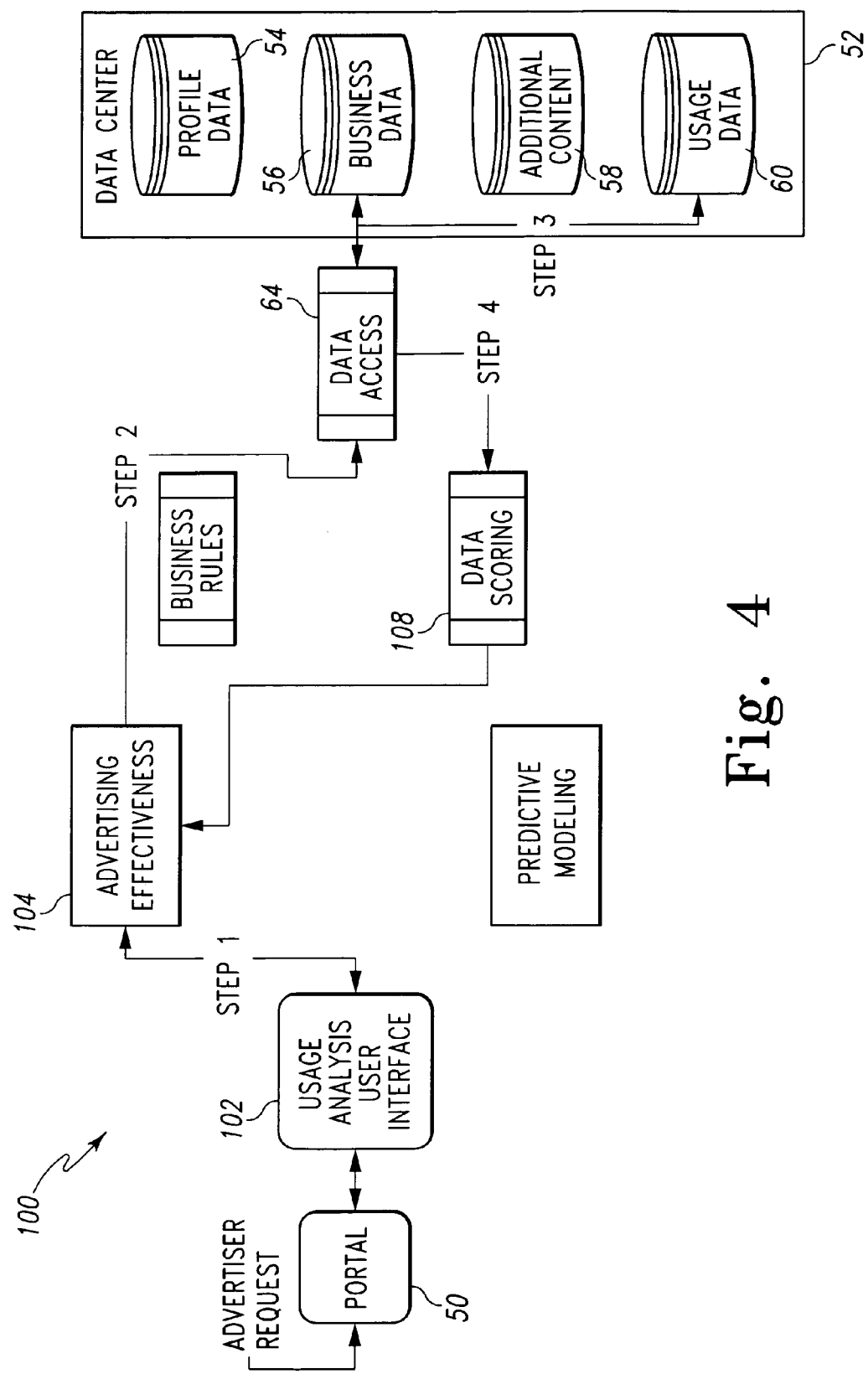
FIG. 4 illustrates a preferred advertising effectiveness application for a location-based services system.

The preferred steps performed by the advertising effectiveness application 104 are illustrated in FIG. 4. The advertising effectiveness application 104 utilizes the business data files 56 and the usage data database 60 in the location-based services system 10 to generate analysis surrounding the effectiveness of location-based advertising campaigns. The analysis will be capable of addressing questions such as "How many people received my campaign in the downtown area of Atlanta?" The information provided to advertisers provides them with insight to quantify the results of advertising campaigns created with the location-based services system 10.

The user must first determine and enter the input variables that will be used for searching, which is preferentially done via a web-based interface using the business remote terminal 46. Once a search query is entered, it is used to retrieve and view the data stored in the business data files 56 and the usage data database 60. The advertising effectiveness application 104 retrieves data from the business data files 56 and the usage data database 60 to match request parameters that are input by the user. The advertising effectiveness application 104 will then forward the search results to the usage analysis user interface 102, which displays the resulting search response via the web browser on the business remote terminal 46.

Referring to FIG. 4, during operation a user of business remote terminal 46 receives a query entry form from the usage analysis user interface 102. Once a user enters search parameters into the query fields on the query entry form, a search request is sent from business remote terminal 46 to the advertiser portal 50. If the user is using the advertising effectiveness application 104, the search request is sent to a data access component 64. The data access component 64 searches the business data file 56 and the usage data database 60 to retrieve search results that match the criteria set forth in the search request. The search results may then be directed toward a data scoring application 108, which is capable of reformatting the search results into various different types of formats.

As illustrated in FIG. 1, in the preferred embodiment of the present invention the content files 52 are located on the location-based application server 28. As such, although not specifically illustrated in FIGS. 3-5, the usage analysis user interface 102 may have to access the location-based application server 28 to retrieve the desired information. In addition, the data access component 64 is preferentially located on the location-based application server 28. As such, the usage mining system 100 preferentially generates search requests that are transmitted to the data access component which in turn, actually performs the searching on the location-based application server 28. However, in other preferred embodiments of the present invention the content files 52 could be mirrored on the advertiser portal 50 and all processes could be performed at that location as well.

Once the search results are placed in the proper format, the advertising effectiveness application 104 uses the usage analysis user interface 102 to generate a viewable output on business remote terminal 46. Preferentially, the results are provided using a web browser on the business remote terminal 46; however, other ways of providing the results may also be used. The search results may be displayed using numbers, graphs, charts, images or any other method for providing analysis results.

A list of inputs (at a minimum) that may be used within the advertising effectiveness application 104 include, but are not necessarily limited to: a respective advertising campaign, demographic information, a date or time period, location information, by category, type of listing category, competitive listing categories and a key word inputs. Examples of the type of feedback the user will receive include (but are not necessarily limited to) the following: measure of number of customers reached; frequency of advertisement or listing; competitive analysis comparing advertising listing frequency to category; cost per impression; number of customers reached by top three demographic segments; and 1) demographics (gender, age, ethnicity, marital status, children, income, special interests, hobby, education, homeowner, car owner); 2) target market (city and state); and 3) location (address and location at time of historical interaction).

Figure 5:
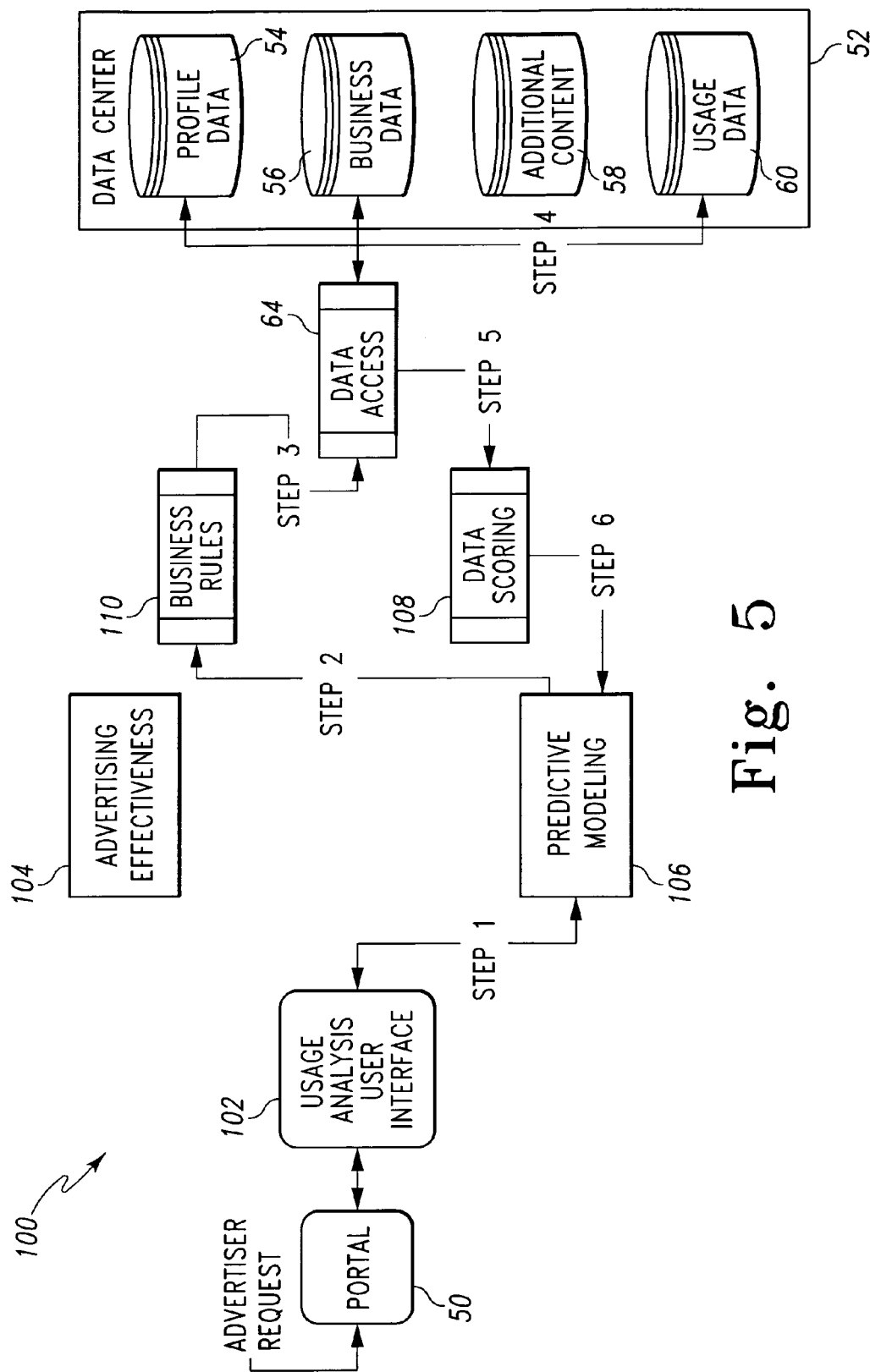
FIG. 5 illustrates a preferred predictive modeling application for a location-based services system.

The preferred steps performed by the predictive modeling application 106 are illustrated in FIG. 5. The predictive modeling application 106 provides the capability of forecasting or making projections of the type and number of users using remote terminals 12, 40 that will likely respond to offers, listings, campaigns and deals. Examples of the type of feedback the user will receive include (but are not necessarily limited to) the following: identifying customers likely to respond to their campaign by customer segment; identifying customers likely to respond to campaigns or offers for certain products or services, identifying customers likely to request a campaign or listing by customer segment; and identifying demands by peak time or day.

During operation, the user enters as an input into the predictive modeling application 106 the proposed future advertising campaign/deal as well as the business rules associated with it. Entering and submitting this information builds a search query with the necessary search parameters to explore the profile database 54 and the usage data database 60. The data access component 64 searches the respective databases to find data elements that match the search query. The search results obtained are preferentially sent to the data scoring application 108 to determine the statistical probability of a proposed campaign's success. These results are then returned to the predictive analysis application 106 to be displayed through the usage analysis user interface 102 on the business remote terminal 46.

Referring to FIG. 5, if an advertiser uses the predictive modeling application 106, preferentially the usage analysis user interface 102 generates a search parameter entry form that is sent from the advertiser portal 50 to the business remote terminal 46. This allows advertisers to enter search parameters that include potential products or services that are going to be offered along with the business rules that go along with the potential offering. The business rules may include discount information, special deals (e.g., buy two, get one free), special rates or any other type of incentive or restriction. Once the search parameters are entered, the advertiser submits them to the advertiser portal 50, which then forwards the search parameters to the predictive modeling application 106.

The predictive modeling application 106 then uses a business rules application 110 to extract the appropriate parameters from the search request to formulate a proper search to be submitted to the profile database 54 and the usage data database 60. Once formatted into a proper search format, the business rules application 110 uses data access component 64 to run a search through the profile database 54 and the usage data database 60. The data access component 64 then forwards the search results to the data scoring application 108, which formats the results into one of several possible viewable formats.

After the data scoring application 108 formats the search results into a usable format, the search results are sent to the predictive modeling application 106. The predictive modeling application 106 then uses the usage analysis user interface 102 to transmit the response from the advertiser portal 50 to the business remote terminal 46. Preferentially, the results are presented to the advertiser via a web browser on the business remote terminal 46.

The predictive mining input options that are available to advertisers include (but are not necessarily limited to) the following: advertising campaigns; target dates (start date and end date); type of listing category; demographics (gender, age, ethnicity, marital status, children, income, special interests, hobby, education, homeowner, car owner); 2) target market (city and state); and 3) location (address and location at time of historical interaction). Other input options can be provided as needed to allow a more flexible search to be conducted by the advertiser.

Although not illustrated, in the preferred embodiment of the present invention a wireless communication device may be used to mine data from the location-based services system 10. In this embodiment, the wireless communication device connects to the advertiser portal 50 and uses a wireless application protocol to submit searches in a similar fashion as set forth above. As such, those skilled in the art should recognize that the business remote terminal 46 does not have to be limited to a personal computer and should also be viewed as including wireless communication devices as well.

While the invention has been described in its currently best-known modes of operation and embodiments, other modes, embodiments and advantages of the present invention will be apparent to those skilled in the art and are contemplated herein.

What is claimed is:

1. A system to predict advertising effectiveness related to wireless mobile devices, the system comprising:
  a location gateway server configured to provide geographical indicators indicative of respective current geographic locations of wireless mobile devices that are operable as portable transceivers to both transmit and receive data;
  a location based application server in communication with the location gateway server, the location based application server configured to provide location based advertising campaigns to wireless mobile devices located anywhere in a geographic area defined by a respective location based advertising campaign, the location based application server adapted to determine which wireless mobile devices to include in the location based advertising campaigns by comparison of the defined geographic area with respective current geographic locations of the wireless mobile devices based on the geographical indicators provided by the location gateway server;
  a database in communication with the location based application server, the database configured to store consumer usage data collected during performance of consumer transactions, the usage data comprising a time and date that a respective location based advertising campaign was run, and the consumer transactions being performed with wireless mobile devices in response to said advertising campaigns and profile data specific to a consumer operating a respective wireless mobile device that is capable of communication with the location based application server; and
  an advertising portal server in communication with the location based application server, the advertising portal server comprising a predictive modeling application, the advertising portal server configured to generate a predictive analysis to forecast the effectiveness of a proposed future location based advertising campaign based on the profile data and the usage data collected during performance of consumer transactions;
  the advertising portal server further configured to generate the predictive analysis with the predictive modeling application in response to an advertising analysis request from a user that includes a business rule comprising an incentive or restriction and a potential offer of a product or a service included in the proposed future location based advertising campaign;
  the advertising portal server further comprising an advertising effectiveness analysis application and a data scoring application, the advertising portal server further configured to determine components of the database to access with the advertising effectiveness analysis application based on the advertising analysis request;
  the advertising portal server further configured to reformat into a predetermined format information retrieved from the database in response to the advertising analysis request, the information reformatted in the predetermined format with the data scoring application to form analysis results; and
  the advertising portal server further configured to provide the analysis results in a viewable output for display on a remote terminal.

2. The system of claim 1, wherein the advertising portal server is further configured to generate with the predictive modeling application a forecast of a statistical probability of success of the proposed future location based advertising campaign and provide the forecast in the viewable output for display on the remote terminal.

3. The system of claim 1, wherein generation of the predictive analysis of the effectiveness of a proposed location based advertising campaign comprises the advertising portal server further configured to generate with the predictive modeling application model information that forecasts a type and number of consumers likely to respond to the proposed future location based advertising campaign, and the advertising portal server further configured to provide the model, information in the viewable output for display on the remote terminal.

4. The system of claim 1, wherein generation of the predictive analysis of the effectiveness of a proposed location based advertising campaign comprises the advertising portal server further configured to generate with the predictive modeling application model information that forecasts projected locations and peak times of day that demand will occur in response to the proposed future location based advertising campaign, and the advertising portal server further configured to provide the model information in the viewable output for display on the remote terminal.

5. The system of claim 1, wherein the advertising portal server is further configured to build a search query based on the advertising analysis request, the advertising portal server further configured to search the consumer usage data and the profile data to find data elements that match the search query.

6. The system of claim 1, wherein the advertising portal server further comprises a business rules application, the advertising portal server further configured to extract parameters from the advertising analysis request and formulate a search query with the business rules application.

7. The system of claim 1, wherein the advertising portal server further comprises a data access component, the advertising portal server further configured to search the database with the data access component, the advertising portal server further configured to generate a forecast of the statistical probability of success of the proposed future location based advertising campaign with the data scoring application based on information identified in the database with the data access component.

8. The system of claim 1, wherein the advertising portal server is further configured to generate a search parameter entry form in a web based interface, wherein the advertising analysis request is received by the advertising portal server as data contained within the search parameter entry form.

9. The system of claim 1, wherein the advertising portal server is further configured to retrieve from the database information that includes consumer usage data comprising a location at which a respective location based advertising campaign was accessed with a wireless mobile device.

10. The system of claim 1, wherein the advertising portal server is further configured to retrieve information from the database that includes consumer usage data comprising a total number of consumers who received a respective location based advertising campaign with a respective wireless mobile device.

11. The system of claim 1, wherein the advertising portal server is further configured to retrieve information from the database that includes consumer usage data comprising a total number of consumers who responded to a respective location based advertising campaign received with a respective wireless mobile device.

12. The system of claim 1, wherein the advertising portal server is further configured to retrieve information from the database that includes consumer usage data comprising a product listing for a respective location based advertising campaign.

13. The system of claim 1, wherein the advertising portal server is further configured to retrieve information from the database that includes consumer usage data comprising a service listing for a respective location based advertising campaign.

14. The system of claim 1, wherein the profile data upon which the advertising portal server is configured to base generation of a predictive analysis to forecast the effectiveness of a proposed future location based advertising campaign comprises demographic information of a consumer of a respective wireless mobile device.

15. The system of claim 1, wherein the profile data upon which the advertising portal server is configured to base generation of a predictive analysis to forecast the effectiveness of a proposed future location based advertising campaign comprises privacy preferences of a consumer that uses a respective wireless mobile device.

16. The system of claim 1, wherein the profile data upon which the advertising portal server is configured to base generation of a predictive analysis to forecast the effectiveness of a proposed future location based advertising campaign comprises service subscriptions of a consumer that uses a respective wireless mobile device.

17. The system of claim 1, wherein the profile data upon which the advertising portal server is configured to base generation of a predictive analysis to forecast the effectiveness of a proposed future location based advertising campaign comprises consumer goods and services preferences of a consumer that uses a respective wireless mobile device.

18. The system of claim 1, wherein each of the mobile devices includes a respective unique identifier, and the location gateway server is further configured to provide the geographical indicators to the location based application server in association with the respective unique identifier, the location based application server configured to receive the respective unique identifier from each of the mobile devices for use in determination of which wireless mobile devices to include in the location based advertising campaigns.

19. A system to predict advertising effectiveness related to wireless mobile devices, the system comprising:
  a location gateway server configured to provide geographical indicators indicative of respective current geographic locations of wireless mobile devices that are operable as transceivers to both transmit and receive data;
  a location based application server in communication with the location gateway server, the location based application server configured to provide deployed location based advertising campaigns to wireless mobile devices located anywhere in a defined geographic area,
  the location based application server operable to determine which wireless mobile devices to include in the location based advertising campaigns by comparison of the defined geographic area with the current geographic locations of the respective wireless mobile devices;
  a database in communication with the location based application server, the database configured to collect consumer usage data during performance of consumer transactions by a plurality of consumers, business data, and profile data;
  said consumer usage data is related to consumer transactions previously performed with wireless mobile devices in response to said advertising campaigns, said business data is related to businesses involved in the consumer transactions said profile data is specific to a consumer who operates a wireless mobile device capable of communication with the location based application server; and an advertising portal server in communication with the location based application server, the advertising portal server configured to analyze deployed advertising campaigns with an advertising effectiveness application and forecast a possible future advertising campaign for the plurality of consumers with a predictive modeling application based on the usage data collected during performance of consumer transactions by the plurality of consumers;

the advertising portal server further configured, in response to an analysis request comprising a plurality of user entered search parameters, and based on independent user selection of one of the advertising effectiveness application and the predictive modeling application to access said data to generate a respective advertising effectiveness analysis and a predicted probability of success analysis related to the possible future advertising campaign for the plurality of consumers.

20. The system of claim 19, wherein the analysis request is a request for a forecast of an effectiveness of a proposed location based advertising campaign, the analysis request includes business rules comprising an incentive or restriction and a description of a potential offer of a product or a service in the proposed location based advertising campaign, and the advertising portal server is configured to access the usage data and the profile data to predict a statistical probability of success of the proposed advertising campaign based on the business rules comprising the incentive or restriction and the description of the potential offer of the product or the service.

21. The system of claim 19, wherein the analysis request is a request for analysis of the effectiveness of a deployed location based advertising campaign previously provided by the location based application server, and the advertising portal server is configured to access the usage data and the business data, generate an analysis of an effectiveness of the deployed location based advertising campaign, and provide the effectiveness of the deployed location based advertising campaign as analysis results in a viewable output for display on a remote terminal.

22. The system of claim 19, wherein the business data includes a business name, a business address and a business product or service for each of a plurality of businesses.

23. The system of claim 19, wherein the advertising portal server is also configured to include a data access component and a data scoring application, wherein the advertising portal server is configured to run a search in the database based on the analysis request with the data access component, format search results to a predetermined format with the data scoring application, and provide the formatted search results in a viewable output for display on a remote terminal.

24. The system of claim 23, wherein the advertising portal server is configured to determine with the data scoring application, based on the search results, a statistical probability of success of a proposed advertising campaign included in the analysis and provide the statistical probability of success as part of the viewable output for display on the remote terminal.

25. The system of claim 19, wherein the advertising portal server is configured to allow modification, addition and deletion of advertising campaigns.

26. A system to predict advertising effectiveness related to wireless mobile devices, the system comprising:
a location gateway server configured to provide indications of respective current geographic locations of wireless mobile devices;
a location based application server in communication with the location gateway server, the location based application server configured to supply location based advertising campaigns to wireless mobile devices based on the respective current geographic locations of the wireless mobile devices being within a geographic area defined by a respective location based advertising campaign;
a database in communication with the location based application server, the database configured to collect consumer usage data during performance of consumer transactions with wireless mobile devices in response to the advertising campaigns, and to collect business information related to businesses involved in the consumer transactions; and
an advertising portal server in communication with the location based application server, the advertising portal server configured to generate an analysis of the effectiveness of location based advertising in response to receipt of an advertising analysis request from a remote terminal, the advertising analysis request comprising a plurality of request parameters that include location information and a time period;
the advertising portal server further configured to perform the analysis of the effectiveness of location based advertising by a search of the consumer usage data collected during the performance of consumer transactions and the collected business information included in the database to identify search results in accordance with the location information and the time period that match the advertising analysis request; and
the advertising portal server further configured to generate a viewable output of the search results, the viewable output provided to the remote terminal,
wherein the advertising portal server comprises an advertising effectiveness analysis application and a data scoring application, the advertising portal server configured to determine components of the database to access with the advertising effectiveness analysis application based on the advertising analysis request, and the advertising portal server configured to reformat into a predetermined format with the data scoring application information that is retrieved from the database in response to the advertising analysis request.

27. A method of predicting advertising effectiveness related to wireless mobile devices, the method comprising:
defining geographic target areas with respective deployed advertising campaigns;
receiving current geographic locations of respective wireless mobile devices that are operable as transceivers to both transmit and receive data;
comparing the geographic target area of respective deployed advertising campaigns with the current geographic locations of the respective wireless mobile devices with a location-based application server to determine whether the wireless mobile devices are currently located within the target area of the respective deployed advertising campaigns;
transmitting advertisements for goods or services from the deployed advertising campaigns to the wireless mobile devices with the location-based application server in response to respective current geographic locations of the wireless mobile devices being located within geographic target areas of the respective deployed advertising campaigns;
tracking consumer transactions performed with the wireless devices related to the deployed advertising campaigns with the location-based application server;
determining a geographic location of a business associated with the deployed advertising campaign with the location-based application server;

receiving at an advertising portal server a search request for advertising analysis comprising a plurality of search parameters entered by a user in a user interface of a remote terminal;

determining the effectiveness of one of the deployed advertising campaigns with the advertising portal server based on the tracked consumer transactions when the search request is for an advertising effectiveness analysis, the search parameters comprising identification of the one of the deployed advertising campaigns; and forecasting the success of a proposed future advertising campaign for the business associated with the deployed advertising campaign with the advertising portal server based on the tracked consumer transactions, the determined geographic location of the business associated with the deployed advertising campaign, and user profiles of the users of the wireless devices, when the search request is for a proposed product or service to be offered and a proposed incentive related to the product or service, the search parameters including a description of the proposed product or service and the proposed incentive, the proposed future advertising campaign being different than the deployed advertisement campaigns.

28. The method of claim 27, wherein forecasting the success of a proposed future advertising campaign comprises the advertising portal server predicting a statistical probability of success of the proposed future advertising campaign, and the advertising portal server providing the statistical probability of success as viewable output to the remote terminal.

29. The method of claim 27, wherein tracking consumer transactions performed comprises the location-based application server tracking a geographic location where each of the consumer transactions is performed.

30. The method of claim 27, further comprising providing the effectiveness of one of the deployed advertising campaigns or the forecasted success of a proposed future advertising campaign as a viewable output in the user interface of the remote terminal in response to the search request.

* * * * *

UNITED STATES PATENT AND TRADEMARK OFFICE
CERTIFICATE OF CORRECTION

PATENT NO.       : 8,738,437 B2                              Page 1 of 1
APPLICATION NO.  : 11/007761
DATED            : May 27, 2014
INVENTOR(S)      : Michael L. Gailey et al.

It is certified that error appears in the above-identified patent and that said Letters Patent is hereby corrected as shown below:

<u>In the Claims</u>

Column 24, line 64, after "transactions" insert --, and--.

Signed and Sealed this
Seventeenth Day of February, 2015

Michelle K. Lee
*Deputy Director of the United States Patent and Trademark Office*